(12) United States Patent
Chang et al.

(10) Patent No.: US 10,913,665 B2
(45) Date of Patent: Feb. 9, 2021

(54) IRON BASED MEDIA

(71) Applicant: HÖGANÄS AB (PUBL), Höganäs (SE)

(72) Inventors: Hyunshik Chang, Johnstown, PA (US); Madan Tandukar, Johnstown, PA (US); Paul Endler, Davidsville, PA (US)

(73) Assignee: HÖGANÄS AB (PUBL), Höganäs (SE)

(*) Notice: Subject to any disclaimer, the term of this patent is extended or adjusted under 35 U.S.C. 154(b) by 217 days.

(21) Appl. No.: 15/726,800

(22) Filed: Oct. 6, 2017

(65) Prior Publication Data

US 2018/0099877 A1    Apr. 12, 2018

Related U.S. Application Data

(60) Provisional application No. 62/404,887, filed on Oct. 6, 2016.

(30) Foreign Application Priority Data

Nov. 7, 2016  (EP) .................... 16197543

(51) Int. Cl.
*C02F 1/28* (2006.01)
*B01D 39/06* (2006.01)
(Continued)

(52) U.S. Cl.
CPC ............ *C02F 1/281* (2013.01); *B01D 15/206* (2013.01); *B01D 39/06* (2013.01); *B01J 20/0229* (2013.01);
(Continued)

(58) Field of Classification Search
CPC ........ C02F 1/281; C02F 1/66; C02F 2101/20; C02F 2101/36; C02F 2101/22;
(Continued)

(56) References Cited

U.S. PATENT DOCUMENTS 3,718,594 A * 2/1973 Miller ................. G03G 9/1075
430/137.13
2012/0160775 A1* 6/2012 Hu ..................... B01J 20/28004
210/688
(Continued)

FOREIGN PATENT DOCUMENTS

EP    2 141 126 A1   1/2010
JP    4963984 B2    6/2012
(Continued)

OTHER PUBLICATIONS

Masuda (JP-4963984 original and translation) (Year: 2012).*
(Continued)

*Primary Examiner* — Liam Royce
(74) *Attorney, Agent, or Firm* — Buchanan Ingersoll & Rooney P.C.

(57) ABSTRACT

A filtering medium for removing the content of contaminants in fluids, wherein said filtering medium includes an acid-washed iron-based powder, wherein the acid-washed iron-based powder is formed by washing an iron-based powder in HCl, wherein the BET surface area of the acid-washed iron-based powder is at least 1.2 m²/g, wherein the acid-washed iron-based powder has a Fe content of at least 90% by weight. And, a method for reducing the content of contaminants in fluids including the steps of: a) providing the filtering medium, b) bringing one or more contaminated fluid(s) in contact with the filtering medium to reduce the content of contaminants in said one or more fluid(s), c) optionally removing the filtering medium from the one or more fluid(s) with a reduced content of contaminants.

20 Claims, 13 Drawing Sheets

Washing and Rinsing
1. Charge the source media in the blender drum.
2. Fill up with water.
3. Rotate the blender drum while nitrogen and exhaust valves are open.
4. Inject hydrochloric acid.
5. Decant the water after stop the blender drum.
6. Start rinse process (fill up water, rotate the blender drum, decant).

Drying
1. Turn on hot oil unit.
2. Start vacuum pump after open vacuum valves.
3. Close the exhaust valve.
4. Rotate the blender drum until media become dry.
5. Stop the blender drum.
6. Stop the hot oil unit and vacuum system.
7. Open the exhaust valve.
8. Close the nitrogen valve.
9. Discharge the dried

Cooling
1. Transport the discharged media to the cooling tower.
2. Supply nitrogen gas.
3. Open the cooling water valve.
4. Transmit the media through the cooling tower.
5. Cooling water off.
6. Nitrogen valve off.

(51) Int. Cl.
- *C02F 1/66* (2006.01)
- *B01J 20/30* (2006.01)
- *B01J 20/28* (2006.01)
- *B01D 15/20* (2006.01)
- *B01J 20/02* (2006.01)
- *B09C 1/00* (2006.01)
- *B09C 1/08* (2006.01)
- *B09C 1/10* (2006.01)
- *C02F 101/20* (2006.01)
- *C02F 101/00* (2006.01)
- *C02F 101/10* (2006.01)
- *C02F 101/22* (2006.01)
- *C02F 101/36* (2006.01)

(52) U.S. Cl.
CPC ... *B01J 20/28004* (2013.01); *B01J 20/28057* (2013.01); *B01J 20/28059* (2013.01); *B01J 20/3071* (2013.01); *B01J 20/3078* (2013.01); *C02F 1/66* (2013.01); *B09C 1/002* (2013.01); *B09C 1/08* (2013.01); *B09C 1/10* (2013.01); *B09C 2101/00* (2013.01); *C02F 2101/006* (2013.01); *C02F 2101/103* (2013.01); *C02F 2101/20* (2013.01); *C02F 2101/22* (2013.01); *C02F 2101/36* (2013.01)

(58) Field of Classification Search
CPC .......... C02F 2101/103; C02F 2101/006; B01J 20/28057; B01J 20/3078; B01J 20/3071; B01J 20/28059; B01J 20/28004; B01J 20/0229; B01D 15/206; B01D 39/06; B09C 2101/00; B09C 1/10; B09C 1/08; B09C 1/002

See application file for complete search history.

(56) References Cited

U.S. PATENT DOCUMENTS

| | | | |
|---|---|---|---|
| 2013/0098840 A1 | 4/2013 | Helferich et al. | |
| 2014/0367341 A1* | 12/2014 | Sasaki | C08K 9/02 210/695 |

FOREIGN PATENT DOCUMENTS

| | | |
|---|---|---|
| RU | 2071807 C1 | 1/1997 |
| RU | 2207934 C2 | 7/2003 |
| RU | 2367542 C2 | 8/2006 |
| RU | 2005129810 A | 11/2020 |
| UA | 1907 A | 12/1994 |
| WO | WO 2004/105984 A1 | 12/2004 |
| WO | WO 2011/015601 A2 | 2/2011 |

OTHER PUBLICATIONS

Su et. al. 1999 "Kinetics of trichloroethene reduction by zerovalent iron and tin: pretreatment effect, apparent activation energy, and intermediate products" Environ. Sci. Technol. 33, 163-168. (Year: 1999).*

Extended European Search Report dated Mar. 21, 2017 for Application No. 16197543.8.

Mueller et al., "Nano zero valent iron—The solution for water and soil remediation?", ObservatoryNANO focus report, Dec. 2010, pp. 1-32.

Official Action and Search Report issued in corresponding Russian Patent Application 2019113156/05, dated Nov. 25, 2020 (English translation provided), 8 pages.

* cited by examiner

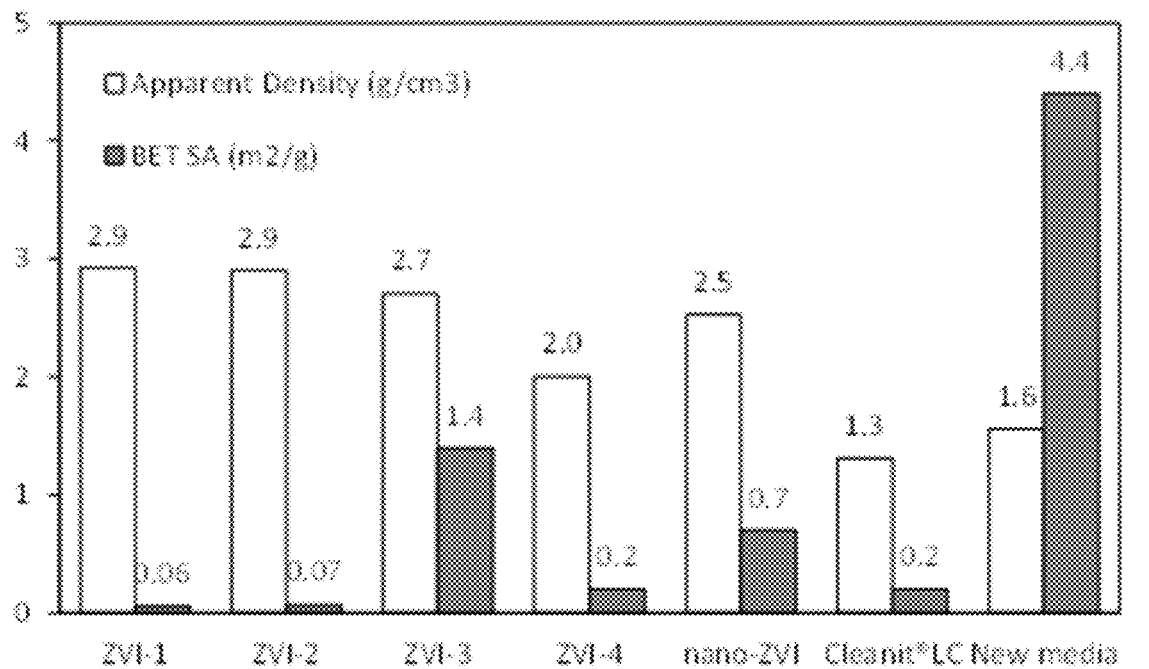

|  | ZVI-1 | ZVI-2 | ZVI-3 | ZVI-4 | Nano-ZVI |
|---|---|---|---|---|---|
| Manufacturer | North American Höganäs | Rio Tinto | Peerless | North American Höganäs | ISP Technologies INC. |
| Trade name | ASC-300 | H2O met 86 | PMP Zero Valent Iron Aggregate size 50D | LD-80 | Micropowder Iron Grade S-1651 (Carbonyl Iron) |

FIG. 1

| Washing and Rinsing | Drying | Cooling |
|---|---|---|
| 1. Charge the source media in the blender drum.<br>2. Fill up with water.<br>3. Rotate the blender drum while nitrogen and exhaust valves are open.<br>4. Inject hydrochloric acid.<br>5. Decant the water after stop the blender drum.<br>6. Start rinse process (fill up water, rotate the blender drum, decant). | 1. Turn on hot oil unit.<br>2. Start vacuum pump after open vacuum valves.<br>3. Close the exhaust valve.<br>4. Rotate the blender drum until media become dry.<br>5. Stop the blender drum.<br>6. Stop the hot oil unit and vacuum system.<br>7. Open the exhaust valve.<br>8. Close the nitrogen valve.<br>9. Discharge the dried | 1. Transport the discharged media to the cooling tower.<br>2. Supply nitrogen gas.<br>3. Open the cooling water valve.<br>4. Transmit the media through the cooling tower.<br>5. Cooling water off.<br>6. Nitrogen valve off. |

FIG. 2

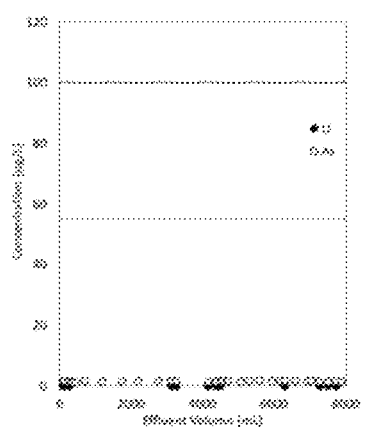 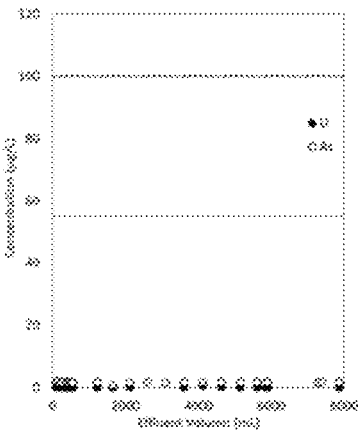 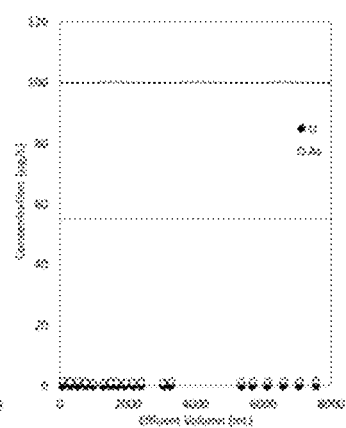
FIG. 9A              FIG. 9B              FIG. 9C
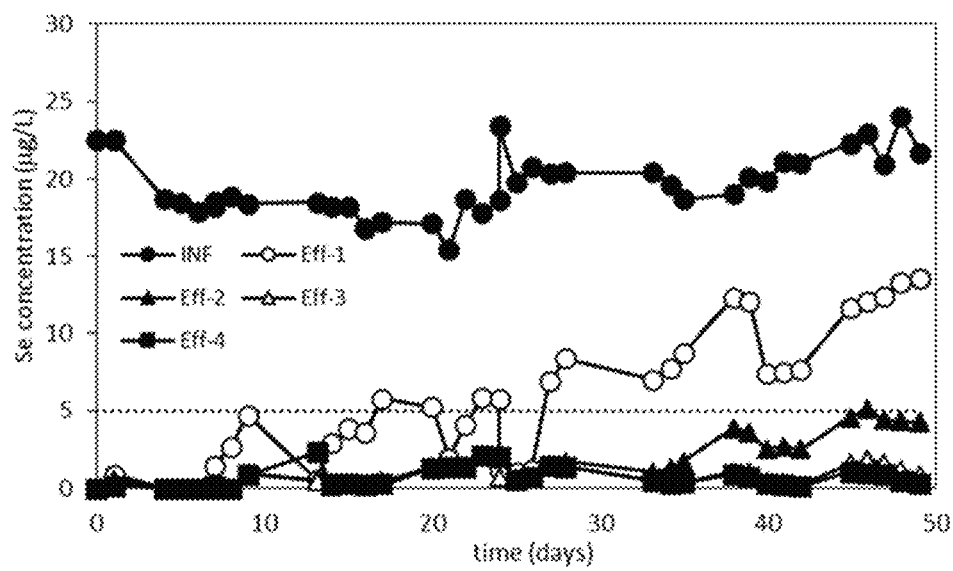
FIG. 10

IRON BASED MEDIA

RELATED APPLICATIONS

The present application claims the benefit of U.S. Provisional Application No. 62/404,887, filed on Oct. 6, 2016, and the benefit of European Application No. 16197543.8, filed on Nov. 7, 2016. The entire contents of each of U.S. Provisional Application No. 62/404,887 and European Application No. 16197543.8 are hereby incorporated herein by reference in their entirety.

TECHNICAL FIELD

Embodiments of the present invention concern a new iron-based media for removal of single and multiple contaminants in soil, water or waste water as well as the use of the media.

BACKGROUND

At least since the 1980s zero-valent iron (ZVI) is known to be effective in dehalogenation of halogenated hydrocarbons, occurring as contaminants, for example, in contaminated water or soil. The chemical reactions behind the dehalogenation, seem to be rather complex and involve reaction steps as direct electron transfer, hydrogen gas evolvement and formation of ferrous iron.

Not only decomposition of halogenated, e.g., chlorinated, hydrocarbon have been proven to be facilitated by ZVI, but also removal of hazardous heavy metals and radionuclides may be performed by contacting contaminated water or soil with ZVI.

Zero-valent iron has also been widely evaluated as a robust filter media for removing and/or degrading of specific organic substances, e.g., trichloroethylene (TCE), and tetrachloroethylene (PCE) and inorganic groundwater contaminants, including nitrate ($NO_3^-$), hexavalent chromium (Cr(VI)), arsenic (As), selenium (Se), and radionuclides such as uranium (U), plutonium (Pu), and technetium (Tc).

However, several common limitations have been observed to the application of ZVI for groundwater and wastewater treatment. The limitations include:

- Development of an oxidized passivation layer (i.e., metal hydroxides and metal carbonates) on the ZVI media surface that hinders continued effectiveness and reduces hydraulic conductivity.
- Narrow effective pH range for select target contaminants.
- Interference by alternate electron acceptors under oxic conditions, examples of such electron acceptors may be oxygen ($O_2$), $NO_3^-$, and sulfate ($SO_4^{2-}$).
- Limited effectiveness for certain contaminants.
- Potential release of immobilized contaminants from the aged and/or spent ZVI media.

Several approaches have been proposed for enhancing the reactivity of ZVI media to address the recognized limitations discussed above. For example, the addition of a bimetallic catalyst may improve efficiency for the reduction of contaminant species with high oxidation potentials such as chromate ($CrO_4^{2-}$) containing Cr(VI). The addition of carbon dioxide ($CO_2$) to lower the initial pH as a means of addressing the alkalinity generated in the ZVI/$H_2O$ system may improve contaminant retention efficiency.

Furthermore, the addition of Fe oxides to the ZVI system has been suggested in order to catalyze the reduction of certain species such as Cr(VI), U(VI), and $NO_3^-$ by Fe(II).

SUMMARY

Embodiments of a new media include a reactivity enhanced ZVI media containing iron. Embodiments of the new media may enable some or all of the following:

- high hydrogen gas production. For example, embodiments of the new media may present a high reactivity with greater hydrogen gas production from the water compared to known ZVI media. For example, embodiments of the new media show at least 4 times higher gas production rate, and total yield of gas production is 6 times greater than known ZVI media.
- multiple contaminants removal. For example, embodiments of the new media are able to achieve simultaneous removal of multiple contaminants in one step treatment, e.g., multiple radionuclides and contaminants removal from contaminated groundwater.
- pH control. Laboratory data show that embodiments of the new media may stabilize the pH of the system at circum-neutral range (e.g., 6-8 pH), which is a benefit when embodiments of the new media are applied with microbial in-situ soil remediation process, and other remediation processes.
- no interference from alternative electron acceptors. For example, embodiments of the new media may create a highly reductive condition, which eliminates or significantly reduces the interference from other electron acceptors, e.g., $O_2$, $NO_3^-$, and $SO_4^{2-}$.

Embodiments of the new media may further be characterized by:

- having a porous structure with fine pores.
- remarkably high surface area in relation to a relatively coarse particle size distribution (e.g. BET specific surface area of at least 1.2 $m^2/g$).
- passive layer removal. One purpose of the acid washing is to remove the passive oxide layer on the surface of ZVI media. The manufacturing of embodiments of the new media may use hydrochloric acid for the acid washing process. However, through a controlled acid washing process (acid concentration, washing cycle, temperature, protective atmosphere such as $N_2$ atmosphere), a fraction of chlorine adheres on the surface of the new media; then acting as a catalyst.
- low Mn content (e.g., less than 0.2 wt %, less than 0.16 wt %, less than 0.14 wt %) to prevent a discoloring problem of the treated water Embodiments of the present disclosure may include a filtering medium for reducing the content of contaminants in fluids, wherein said filtering medium includes an acid-washed iron-based powder. The acid-washed iron-based powder may be formed by washing an iron-based powder in HCl. The BET surface area of the acid-washed iron-based powder may be 1.2-10 $m^2/g$, preferably 1.4-8 $m^2/g$, preferably, 1.6-5 $m^2/g$. The acid-washed iron-based powder may have a Fe content of at least 90% by weight, preferably at least 93% by weight, preferably at least 97% by weight.

In an embodiment of the present disclosure, the acid washing may include hydrochloric acid washing, drying, and cooling process in a protective atmosphere, such as a $N_2$ atmosphere.

In an embodiment of the present disclosure, the iron-based powder may be a hydrogen-reduced iron powder.

In an embodiment of the present disclosure, the average particle size (D50) of the acid-washed iron-based powder may be 20 to 10,000 μm, preferably 20 to 500 μm, preferably 40 to 350 μm.

In an embodiment of the present disclosure, the average particle size (D50) of the acid-washed iron-based powder may be 200 to 590 µm, and the BET surface area may be at least 1.6 m$^2$/g.

In an embodiment of the present disclosure, the average particle size (D50) of the acid-washed iron-based powder may be less than 200 µm, preferably less than 150 µm, and the BET surface area is at least 3 m$^2$/g, preferably at least 4 m$^2$/g.

In an embodiment of the present disclosure, the apparent density of the acid-washed iron-based powder may be 0.5 to 5 g/cm$^3$, preferably 1 to 3 g/cm$^3$, preferably 1 to 2 g/cm$^3$.

In an embodiment of the present disclosure, the iron-based powder may be a hydrogen reduced iron-based powder having an average particle size (D50) between 200 and 590 µm and an Fe-content of at least 90% by weight of the iron powder.

In an embodiment of the present disclosure, the acid-washed iron-based powder may have a localized chlorine concentration on the surface of at least 3% by EDX spectral analysis, preferably at least 4% by EDX spectral analysis.

In an embodiment of the present disclosure, the acid-washed iron-based powder may have a PSE of less than −0.03, preferably less than −0.04, preferably less than −0.05, with a range of −0.03 to −0.5 in an equilibrium condition (after 48 hrs).

In an embodiment of the present disclosure, the fraction of acid-washed iron-based powder below 150 µm may be at least 3 m$^2$/g, preferably 3-10 m$^2$/g, preferably 3.5-8 m$^2$/g, preferably 4.0-6.0 m$^2$/g, preferably 4.2 m$^2$/g-5 m$^2$/g.

Embodiments of the present disclosure may include a filtering medium for reducing the content of contaminants in fluids, wherein said filtering medium includes an iron-based powder. The iron-based powder may have a localized chlorine concentration on the surface of at least 3% by EDX spectral analysis, preferably at least 4% by EDX spectral analysis. The BET surface area of the iron-based powder may be 1.2-10 m$^2$/g, preferably 1.4-8 m$^2$/g, preferably, 1.6-5 m$^2$/g. The acid-washed iron-based powder may have a Fe content of at least 90% by weight, preferably at least 93% by weight, preferably at least 97% by weight.

In an embodiment of the present disclosure, the iron-based powder may be a hydrogen-reduced iron powder.

In an embodiment of the present disclosure, the average particle size (D50) of the iron-based powder may be 20 to 10,000 µm, preferably 20 to 500 µm, preferably 40 to 350 µm.

In an embodiment of the present disclosure, the average particle size (D50) of the iron-based powder may be 200 to 590 µm, and the BET surface area may be at least 1.6 m$^2$/g.

In an embodiment of the present disclosure, the average particle size (D50) of the iron-based powder may be less than 200 µm, preferably less than 150 µm, and the BET surface area may be at least 3 m$^2$/g, preferably at least 4 m$^2$/g.

In an embodiment of the present disclosure, the apparent density of the iron-based powder may be 0.5 to 5 g/cm$^3$, preferably 1 to 3 g/cm$^3$, preferably 1 to 2 g/cm$^3$.

In an embodiment of the present disclosure, the iron-based powder may be a hydrogen reduced iron-based powder having an average particle size (D50) between 40 and 590 µm and an Fe-content of at least 90% by weight of the iron powder.

In an embodiment of the present disclosure, the iron-based powder may be an acid-washed iron-based powder formed by washing an iron-based powder in HCl.

In an embodiment of the present disclosure, the acid washing comprises hydrochloric acid washing, drying, and cooling process in a N$_2$ atmosphere.

In an embodiment of the present disclosure, the acid-washed iron-based powder may have a PSE of less than −0.03, preferably less than −0.04, preferably less than −0.05, with a range of −0.03 to −0.5 in an equilibrium condition (after 48 hrs).

In an embodiment of the present disclosure, the fraction of acid-washed iron-based powder below 150 µm may be at least 3 m$^2$/g, preferably 3-10 m$^2$/g, preferably 3.5-8 m$^2$/g, preferably 4.0-6.0 m$^2$/g, preferably 4.2 m$^2$/g-5 m$^2$/g.

Embodiments of the present disclosure may include a method for reducing the content of contaminants in fluids including the steps of:
a) providing a filtering medium according to embodiments of the present disclosure,
b) bringing one or more contaminated fluid(s) in contact with the filtering medium to reduce the content of contaminants in said one or more fluid(s),
c) optionally removing the filtering medium from the one or more fluid(s) with a reduced content of contaminants.

In an embodiment of the present disclosure, in step b) one or more contaminated fluid(s) may be allowed to pass through the filtering medium up or downflow direction.

In an embodiment of the present disclosure, said fluid(s) may be contaminated by at least one of chlorinated VOC, radionuclides, and heavy metals. The chlorinated VOC may be chosen from the group consisting of TCE, PCE, and their daughter products.

Embodiments of the present disclosure may include a method for producing a filtering medium, wherein the filtering medium may be according to embodiments of the present disclosure, the method comprising the steps of:
hydrochloric acid washing,
drying and cooling process, optionally in a protective atmosphere, such as an N$_2$ atmosphere.

BRIEF DESCRIPTION OF THE DRAWINGS

FIG. 1 provides a chart of BET surface area and apparent density of various ZVI media, with a particle size of less than 150 µm, as determined by a sieve test.

FIG. 2 provides a summary of an embodiment of a manufacturing process for an embodiment of the new media.

FIGS. 5B-C show a comparison of PSE values from various ZVI media. FIG. 5B: PSE vs. time; FIG. 5C: Final PSE at the end of the experiment.

FIG. 6A shows hydrogen gas production (24 g ZVI media in 200 mL deoxygenated water); FIG. 6B shows pH-E$_h$ behavior (1 g ZVI in 50 mL deoxygenated water, no head space; The location of each sample's label is the final pH-Eh data of the sample at the end of the experiment.

FIG. 7A: U; FIG. 7B: As.

FIG. 8A with $NO_3$; FIG. 8B without $NO_3$.

FIGS. 9A-C provides effluent U and As concentrations in column testes with various EBCT. FIG. 9A: 120 min EBCT; FIG. 9B: 30 min EBCT; FIG. 9C: 7.5 min EBCT.

FIG. 10 Concentration of Se in the influent and the effluent from each column.

FIG. 11A: As; FIG. 11B: Cr(VI).

FIG. 12A: As; FIG. 12B: Cr(VI).

DETAILED DESCRIPTION

Figure 3A:
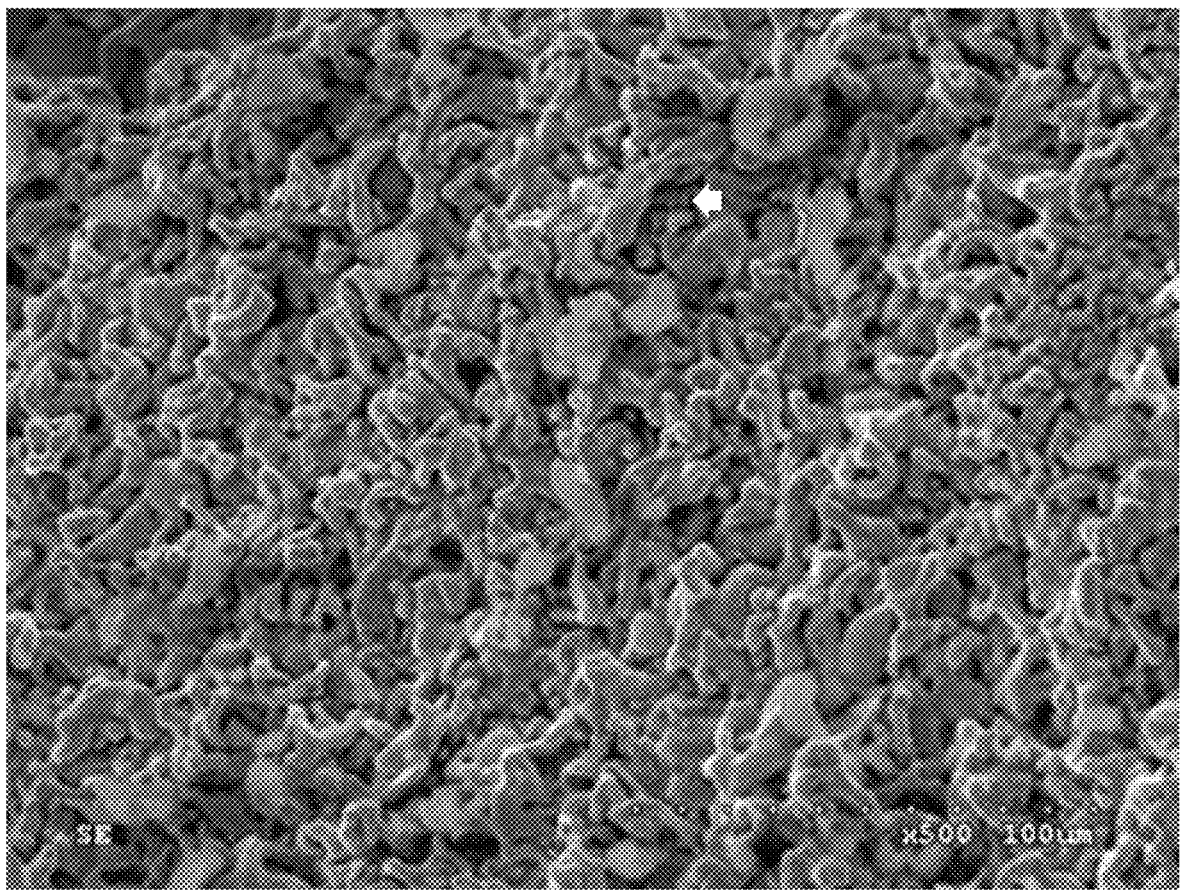
FIGS. 3A-B provide an SEM image (FIG. 3A) and an EDX spectrum (FIG. 3B) of an embodiment of the new media. An arrow points to an area with chlorine adhered on the new media surface.

Various examples and embodiments of the inventive subject matter disclosed here are possible and will be apparent to a person of ordinary skill in the art, given the benefit of this disclosure. In this disclosure reference to "some embodiments," "certain embodiments," "certain exemplary embodiments" and similar phrases each means that those embodiments are non-limiting examples of the inventive subject matter, and there may be alternative embodiments which are not excluded.

The articles "a," "an," and "the" are used herein to refer to one or more than one (i.e., to at least one) of the grammatical object of the article. By way of example, "an element" means one element or more than one element.

As used herein, the term "about" means±10% of the noted value. By way of example only, a composition comprising "about 30 wt. %" of a compound could include from 27 wt. % of the compound up to and including 33 wt. % of the compound.

The word "comprising" is used in a manner consistent with its open-ended meaning, that is, to mean that a given product or process can optionally also have additional features or elements beyond those expressly described. It is understood that wherever embodiments are described with the language "comprising," otherwise analogous embodiments described in terms of "consisting of" and/or "consisting essentially of" are also contemplated and within the scope of this disclosure.

Specific surface area, "BET surface area" is measured according to SS ISO 9277. Particle size distribution is measured according to IS 4497. The term "average particle size (D50)" is here defined as the particle size of a powder wherein 50% by weigh of the powder has a particle size less than D50, and 50% by weight has a particle size above D50.

Embodiments of the present disclosure relate to a filtering medium for reducing the content of contaminants in fluids. The filtering medium may include an acid-washed iron-based powder. The acid-washed iron-based powder may be formed by washing an iron-based powder in HCl. The BET surface area of the acid-washed iron-based powder may be at least 1.2 $m^2$/g, such as 1.2-10 $m^2$/g, preferably at least 1.4-8 $m^2$/g, preferably, 1.6-5 $m^2$/g. At a +60 mesh fraction, the BET surface area may be about 1.9 $m^2$/g. At a −100 mesh fraction, the BET surface area may be 4.4 $m^2$/g. In embodiments, the fraction of acid-washed iron-based powder below 150 μm may be at least 3 $m^2$/g, preferably 3-10 $m^2$/g, preferably 3.5-8 $m^2$/g, preferably 4.0-6.0 $m^2$/g, preferably 4.2 $m^2$/g-5 $m^2$/g.

The acid-washing may include exposing 500 kg of iron-based powder to a 0.4 M HCl solution for at least 20 min under an inert atmosphere, e.g., $N_2$ atmosphere. Then, the wet media may be rinsed out at least twice with water. The drying process may occur at 130-190° F. under vacuum condition for 2 hrs. The final cooling process may occur at the cooling tower with crossflow $N_2$ gas.

The source iron-based powder may be a hydrogen-reduced iron powder. For example, the source iron powder may be formed by the method described in International Patent Publication No. WO 2011/015601 A2, the contents of which are hereby incorporated by reference in its entirety.

The average particle size (D50) of the acid-washed iron-based powder may be 20 to 10,000 μm, preferably 20 to 500 μm, preferably 40 to 350 μm.

In an embodiment, the average particle size (D50) of the acid-washed iron-based powder is 200 to 350 μm, and the BET surface area is at least 1.6 $m^2$/g, preferably at least 1.8 $m^2$/g. For example, 80% of an embodiment of the media is −20+60 mesh (250-590 μm) and BET surface area is in the range of 1.6-3 $m^2$/g, such as 1.91 $m^2$/g.

In an embodiment, the average particle size (D50) of the acid-washed iron-based powder is less than 200 μm, preferably less than 150 μm, and the BET surface area is at least 3 $m^2$/g, preferably at least 4 $m^2$/g.

The apparent density of the acid-washed iron-based powder may be 0.5 to 5 g/$cm^3$, preferably 1 to 3 g/$cm^3$, preferably 1 to 2 g/$cm^3$. The apparent density is measured by the ASTM standard method of "ASTMB703-10 Standard Test Method for Apparent Density of Metal Powders."

The acid-washed iron-based powder may have a Fe content of at least 90% by weight, preferably at least 93% by weight, preferably at least 97% by weight.

In an embodiment, the source iron-based powder may be a hydrogen reduced iron-based powder having an average particle size (D50) between 150 and 850 μm and a Fe-content of at least 90% by weight of the iron powder.

In an embodiment, the acid-washed iron-based powder has a localized chlorine concentration in an area on the surface of at least 3% by EDX spectral analysis, preferably at least 4% by EDX spectral analysis. In an embodiment, the acid-washed iron-based powder has multiple separate areas (e.g., at least two, at least three, at least four areas) on the surface with a localized chlorine concentration of at least 3% by EDX spectral analysis, preferably at least 4% by EDX spectral analysis, as measured by a scanning electron microscopy (e.g. SEM, Hitachi S-2600N) coupled with Energy-dispersive X-ray spectroscopy (e.g. EDS, Quartz XOne) applied for the analysis. The operating voltage is set to 20 kV, and the beam current is set to 55 μA, with a penetration depth of the electron beam of approximately 1.0-1.2 μm. Correspondingly, in an embodiment, the acid-washed iron-based powder has an area, or multiple separate areas, on the surface with no measurable or at least no effective localized chlorine concentration by EDX spectral analysis. To determine localized chlorine concentration, SEM analysis is conducted, wherein the operator chooses a spot based on morphology observation and conducts an analysis with EDS. It gives a relative weight percentage of elements on the spot selected, and the weight percentage of chloride is defined as "localized chlorine concentration." The size of the measured area is determined by the SEM and may have a diameter of about 0.5-1.2 μm.

In an embodiment, the present disclosure relates to a filtering medium for reducing the content of contaminants in fluids. The filtering medium may include an iron-based powder. The acid-washed iron-based powder may have a localized chlorine concentration on the surface of at least 3% by EDX spectral analysis, preferably at least 4% by EDX spectral analysis. The BET surface area of the acid-washed iron-based powder may be at least 1.2 m²/g, such as 1.2-10 m²/g, preferably at least 1.4-8 m²/g, preferably, 1.6-5 m²/g.

In embodiments, the fraction of acid-washed iron-based powder below 150 μm may be at least 3 m²/g, preferably 3-10 m²/g, preferably 3.5-8 m²/g, preferably 4.0-6.0 m²/g, preferably 4.2 m²/g-5 m²/g.

In an embodiment, the present disclosure relates to a method for reducing the content of contaminants in fluids comprising the steps of: a) providing a filtering medium according embodiments of the present disclosure, b) bringing one or more contaminated fluid(s) in contact with the filtering medium to reduce the content of contaminants in said one or more fluid(s), c) optionally removing the filtering medium from the one or more fluid(s) with a reduced content of contaminants.

In an embodiment, in step b), one or more contaminated fluid(s) is/are allowed to pass through the filtering medium.

In an embodiment, the filtering medium may be placed in a column and the fluid(s) pass through the column by up/down flow direction.

In an embodiment, the filtering medium may be added, e.g., via injection, to soil to filter ground water.

The fluid(s) that are filtered may be contaminated by at least one of chlorinated volatile organic compounds (VOC), radionuclides, or heavy metals. The chlorinated VOC may be chosen from the group of PCE, TCE, and their daughter products. The fluid may have an acidic pH.

In an embodiment, U(VI) may be removed, from 100 μg/L to <1 μg/L, in the presence of $O_2$ and/or $NO_3$. This is a surprising effect, as a uranium [U(VI)] removal process generally involves with reduction to U(IV). Thus, if there are oxidants present ($O_2$, $NO_3$, etc.), the removal of U(VI) is difficult. However, embodiments of the present invention removed U(VI), e.g., from 100 μg/L to <1 μg/L, even in the presence of oxidants.

In an embodiment, Mn content (wt %) may be a maximum of 0.20%, preferably a maximum of 0.15% and most preferably a maximum of 0.10%.

In an embodiment, the particle size of source media, e.g., hydrogen reduced iron based media, may be:

Mainly +60-20 mesh (250-590 μm), BET surface area=0.2 m²/g

| Sieve Analysis | | |
|---|---|---|
| Sieve Number | Micron | % by Sieve |
| 30 | 590 | 3.90% |
| 48 | 295 | 54.44% |
| 60 | 250 | 18.34% |
| 100 | 149 | 19.72% |
| 140 | 105 | 2.16% |
| 200 | 74 | 0.44% |
| Pan | — | 1.00% |

In an embodiment, the particle size of an embodiment of the present invention, an acid-washed hydrogen-reduced iron based media may be:

Mainly +60-20 mesh (250-590 μm), BET surface area=1.91 m²/g

| Properties | | |
|---|---|---|
| Physical Properties | | |
| Apparent Density (g/cc) | | 1.42 g/cm³ |
| BET Surface Area (m2/g) | | 1.91 m²/g |
| Particle Size Distribution | | |
| +20 mesh | 850 micron | <0.2% |
| +60 mesh | 250 microns | 79.9% |
| +100 mesh | 149 microns | 17.2% |
| +140 mesh | 105 microns | 0.73% |
| +200 mesh | 74 microns | 0.73% |
| +325 mesh | 45 microns | 0.23% |
| −325 mesh | −45 microns | 1.13% |
| Chemical Properties (%) | | |
| Fe | | 97.84% |
| Oxygen | | 2.02% |
| Mn | | 0.14% |

Fine fraction (−100 mesh, <150 μm), BET surface area=4.42 m²/g

In an embodiment, the filtering medium may be prepared by the steps of FIG. 2.

Embodiments of the present disclosure may have a larger surface area compared to known ZVI media. For example, the surface area of embodiments of the present disclosure may be 4.4-7.1 m²/g, which is approximately 3 to 76 times greater than known ZVI with identical particle size range (45-150 μm). FIG. 1 shows the BET surface area and apparent density (AD) of various ZVI media in less than 150 μm particle size. Apparent density of nano-ZVI media is the greatest due to the smaller particle size. A nano-ZVI has an average particle size diameter of less than 100 nm. However, embodiments of the present disclosure show a larger surface area in spite of having smaller apparent density, which indicates the internal pore structure on the embodiments of the present disclosure. Comparison of the surface area between source media and an embodiment of the present disclosure (the "new media") indicated that the manufacturing process increases the surface area significantly (from 0.2 to 1.9 m²/g). The manufacturing process of the new media is summarized in FIG. 2. A batch of HCl acid-washing process may include exposing 500 kg of source media to a 0.4 M HCl solution for at least 20 min under $N_2$ atmosphere. Then, the wet media may be rinsed out at least twice with water. The drying process may occur at 130-190° F. under vacuum condition for 2 hrs. The final cooling process may occur at the cooling tower with crossflow $N_2$ gas.

Figure 3B:
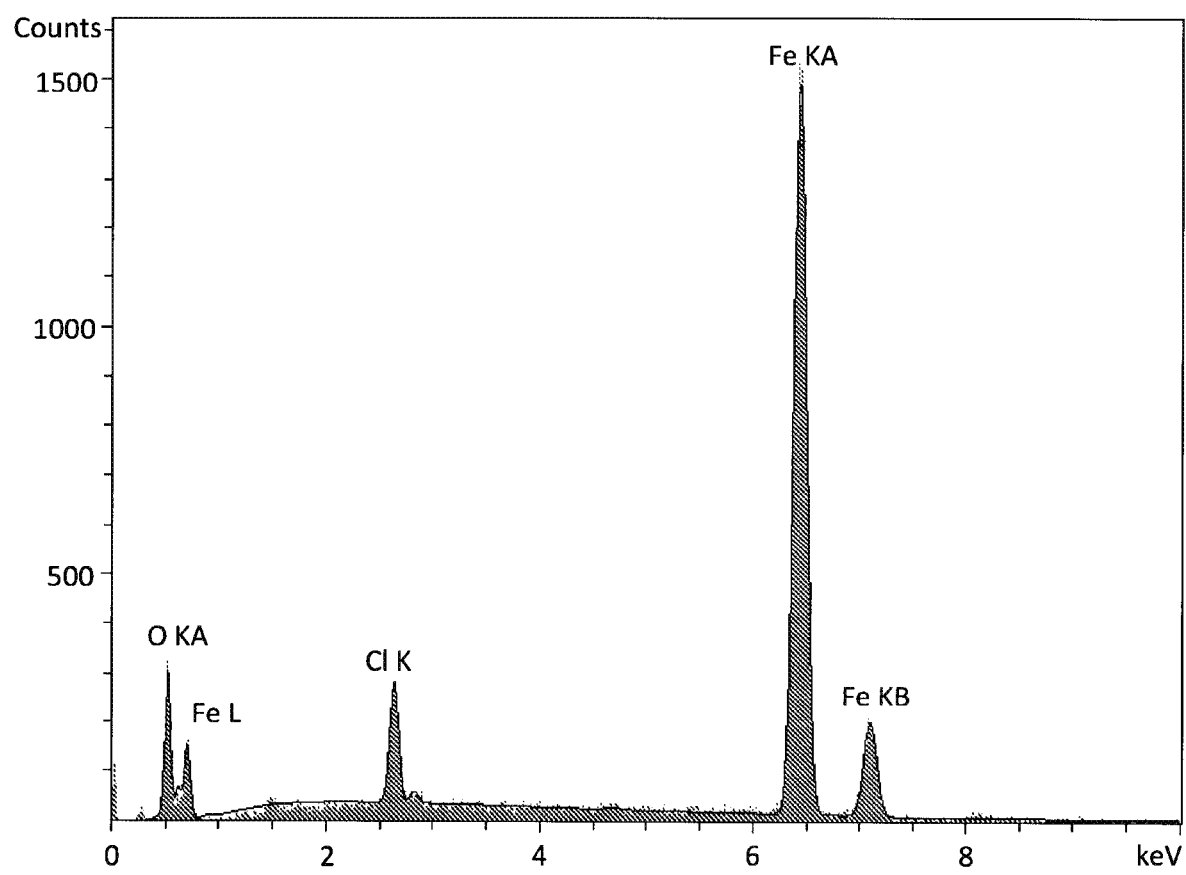

The morphology of the new media is shown in FIGS. 3A and 3B. The SEM image reveals the porous internal structure. In addition, EDS analysis suggested approximately 4.3% of chlorine adhered on the localized surface of the media. The other chemical properties are oxygen (z 2.0%), manganese (z 0.14%), and iron (z 93.6%). Further analysis confirmed that trace amount of chlorine (<4.3%) on the local surface are preferred.

Embodiments of the present disclosure show a high reactivity by removing multiple contaminants simultaneously without being interfered by co-existing chemical species, unlike other ZVI media. For example, 100 μg/L of U(VI) may be removed while 55 μg/L of As is also removed. Embodiments of the present disclosure show exceptional reactivity, which is believed to originate in the high BET surface area of the media, which is approximately 3 to 76 times greater than other ZVI media in identical particle size range. Additionally, SEM-EDS analysis presents the sponge-like surface morphology with chlorine adhered, which may contribute the high reactivity of the new media as well.

For the SEM-EDS analysis, the samples were put directly on the top of an aluminum holder. A scanning electron microscopy (SEM, Hitachi S-2600N) coupled with Energy-dispersive X-ray spectroscopy (EDS, Quartz XOne) was applied for the analysis. The operating voltage was 20 kv, and the beam current was 55 µA. The penetration depth of the electron beam was approximately 1.0-1.2 µm.

The reactivity of embodiments of the present disclosure may be quantified by the production of hydrogen gas from the water. It could be applied for enhancement of dehalogenation microbial activities during soil remediation. Treatability of radionuclides (U, Th, As) for embodiments of the present disclosure was successfully confirmed by batch and column experiments. In addition, robustness of embodiments of the present disclosure against the ambient electron acceptors ($NO_3$ and/or $O_2$) was proved during the experiments. For example, embodiments of the present disclosure were able to remove U(VI) and As while being exposed to a concentration of 23 mg/L of $NO_3$—N and an open atmosphere condition of $O_2$. Selenium in high TDS containing groundwater was successfully removed by a series of columns with embodiments of the present disclosure. The selenium concentration in the effluent was sustained less than 2 µg/L during the study although the groundwater contained high TDS (e.g., a concentration of 1530 mg/L).

These test results prove the unique abilities and characteristics of the new media for a patent.

EXAMPLES AND FURTHER EMBODIMENTS

Example 1

1. Authenticity of Embodiments of the New Media

Authenticity of embodiments of the new media was investigated by comparison of the reactivity. Hydrogen gas production from water was used as an indicator of the reactivity due to general ZVI reactions in water (eq.1-3).

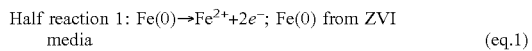

Half reaction 1: $Fe(0) \rightarrow Fe^{2+} + 2e^-$; Fe(0) from ZVI media (eq.1)

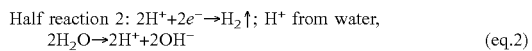

Half reaction 2: $2H^+ + 2e^- \rightarrow H_2\uparrow$; $H^+$ from water, $2H_2O \rightarrow 2H^+ + 2OH^-$ (eq.2)

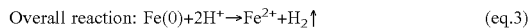

Overall reaction: $Fe(0) + 2H^+ \rightarrow Fe^{2+} + H_2\uparrow$ (eq.3)

Figure 4:
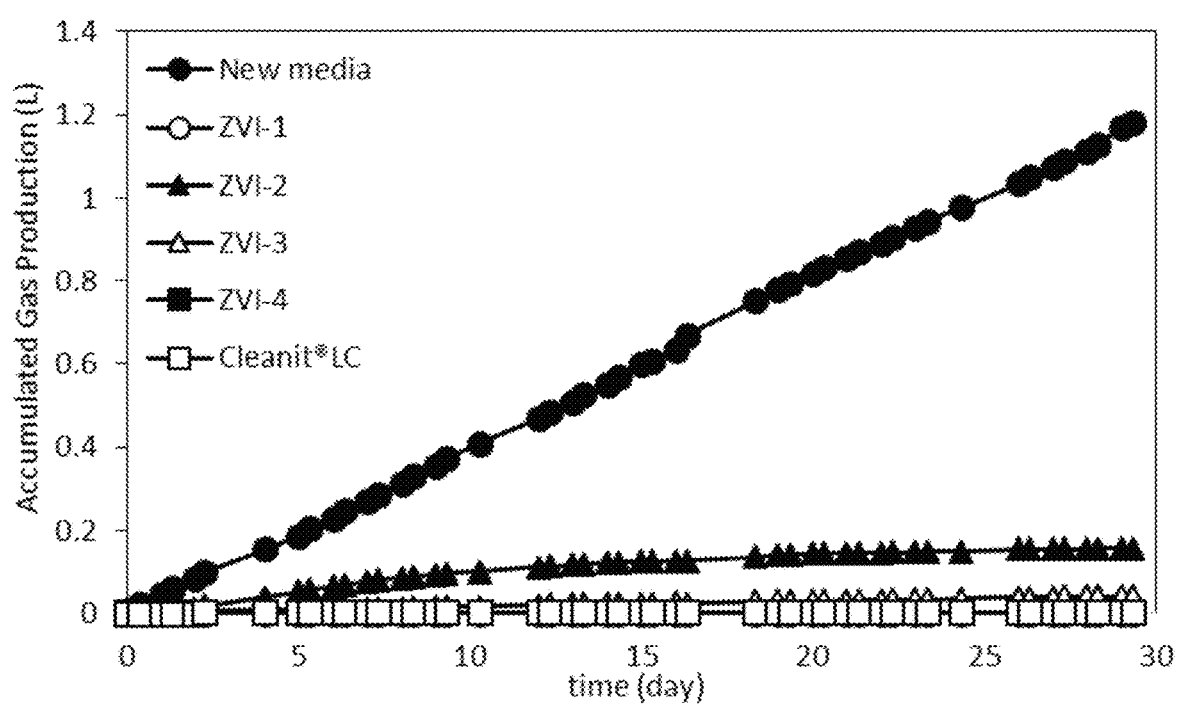
FIG. 4 provides a chart of hydrogen gas production from various ZVI media quantified by monitoring pressure build-up at the headspace per day (24 g ZVI media in 200 mL deoxygenated water).

Hydrogen gas production from individual ZVI media was quantified in a controlled experiment condition. Deoxygenated water was prepared by purging nitrogen gas into DI water over two hours, and identical amount of ZVI media was added to the 250 mL flask (24 g in 200 mL deoxygenated DI water) at ~25° C. Pressure of the headspace and ambient temperature were monitored. The pressurized gas was released daily to prevent leaking by pressure build-up. The pressure reading was converted into gas volume by using the ideal gas law. The presence of hydrogen gas was confirmed by a GC with TCD detector. FIG. 4 shows summarized results. The new media shows 4 times higher (0.04 L/day) gas production rate than that of ZVI-2 (0.01 L/day). Total yield of gas production is 6 times greater for the new media (1.2 L) than ZVI-2 (0.2 L) at the end of the experiment. In addition, the new media kept producing gas at the end of experiment, but ZVI-2 appears to reach its maximum gas production. The uniquely high hydrogen gas production of the embodiment of the new media is believed to be originated from the manufacturing process of the media, since the hydrogen gas production from the source media was negligible.

The hydrogen gas production from ZVI media was measured by the following procedure:

1. Prepared deoxygenated water by purging $N_2$ gas through DI water in a 2 L beaker at least 2 hours.
2. 24 g of ZVI media was added to a 250 mL Erlenmeyer flask.
3. 200 mL of the deoxygenated DI water was added to the flask while $N_2$ gas purging, and put on a rubber cap with gas releasing valves. All valves should be in a closed position.
4. Headspace of each flask was purged with N2 gas at least 5 minutes with controlling valves to avoid atmosphere contact. After the purge, all valves should be closed.
5. Put the flasks on the orbital shaker, and connected the top valve with an air-lock top.
6. Room temperature was maintained at ~25° C.
7. Pressure of the headspace and ambient temperature were monitored daily. The pressurized gas in the headspace was released daily to prevent leaking by pressure build-up.
8. The pressure reading (psi) was converted into gas volume (mL) by using the ideal gas law (PV=nRT). The presence of hydrogen gas was confirmed by a GC with TCD detector after collecting the gas in a gas collection bag for 2 weeks.

In an embodiment of the new media, the hydrogen gas production rate may be at least 0.5 mL/g-day, at least 0.8 mL/g-day, at least, at least 1.2 mL/g-day, 1.6 mL/g-day, for example up to 3.6 mL/g-day, for 30 days of gas collection test, as measured in the procedure above, with 24 g of ZVI media in 200 mL of the deoxygenated DI water.

Without passivation, embodiments of the new media continuously produce hydrogen gas for 200 days, unlike other ZVI media.

Figure 5A:
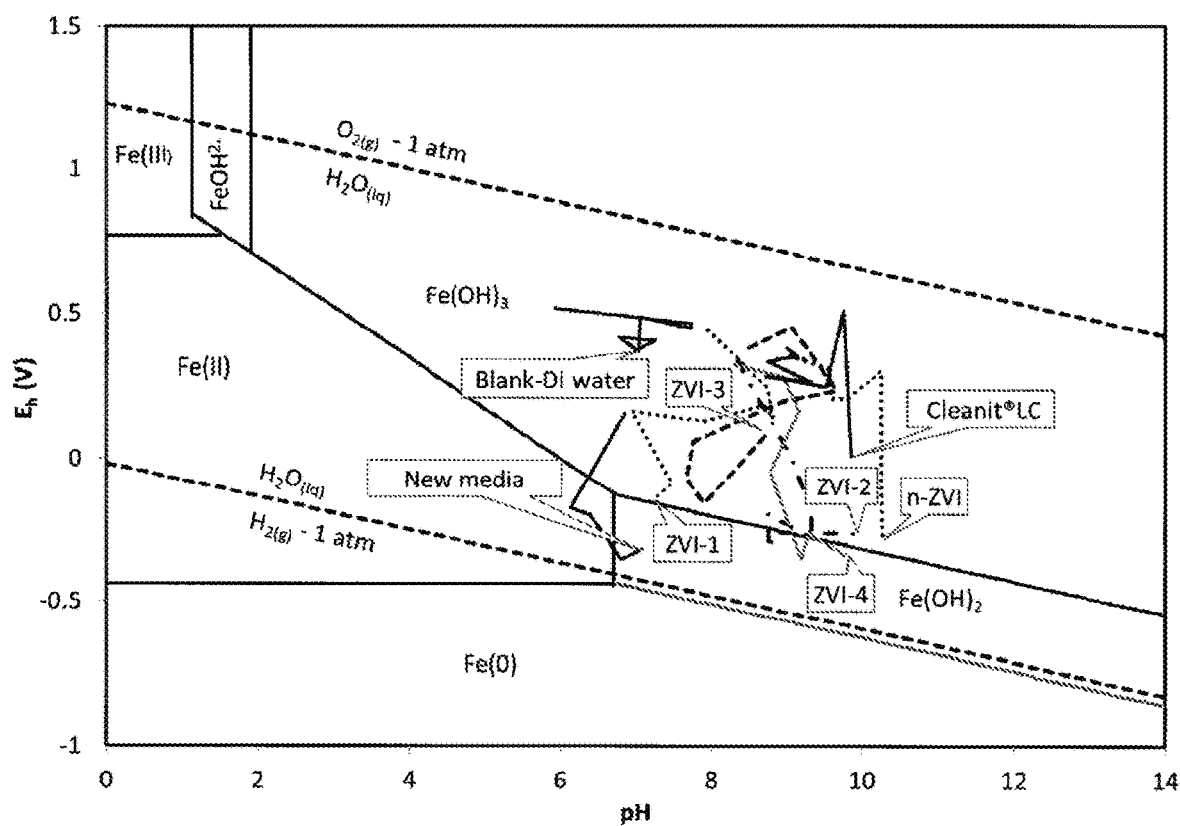
FIGS. 5A-C provide a chart of pH-E$_h$ behavior of various ZVI media (1 g ZVI in 50 mL deoxygenated water, no head space; The location of each sample's label is the final pH-E$_h$ data of the sample at the end of the experiment.

Embodiments of the new media show the superior reactivity represented by a high hydrogen gas production capacity as shown in FIG. 4. In addition, embodiments of the new media maintain the pH in a circum-neutral range (e.g., a pH of about 6-8) when the media reacts with water, unlike other zero valent iron (ZVI) media, which generally raise the pH above 8 (FIG. 5A).

A mechanism of the high hydrogen gas production from embodiments of the new media may be hypothesized by the pH-$E_h$ behavior. FIG. 5A presents a pH-$E_h$ behavior of various ZVI media in Fe—$H_2O$ system using a pH-$E_h$ diagram. While the $E_h$ of the new media decreases (toward more reductive condition), the pH maintains at a circum-neutral condition (pH 6-8). On the other hand, other ZVI media lower the $E_h$ in concert with raises the pH over time. The combination of both lower $E_h$ and maintained pH may generate a favorable condition for hydrogen production from water (closer to the line of $H_2O_{(aq)}/H_{2(g)}$).

A parameter, PSE (pH specific $E_h$), is shown in Equation 1:

$$PSE(V) = \frac{E_h}{pH} \quad \text{(Eq. 1)}$$

The values of $E_h$ and pH used for the calculation were collected at the end of the experiments. PSE is useful for evaluation of the redox potential change along with the pH effect of each ZVI media.

Figure 5B:
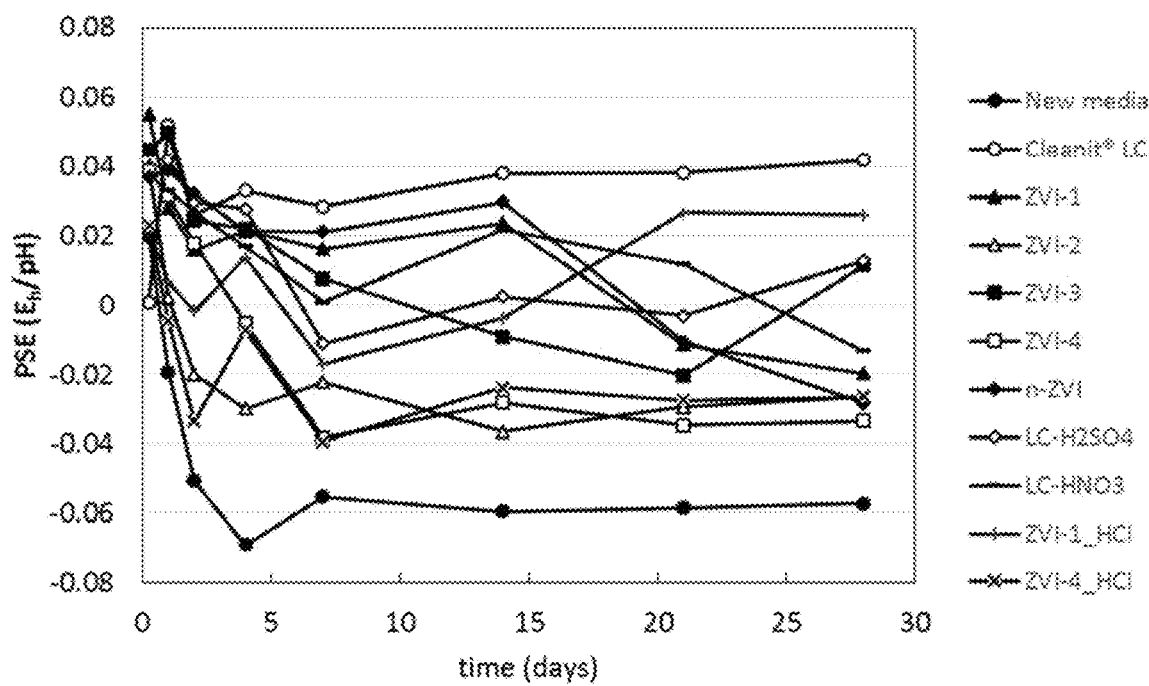
Figure 5C:
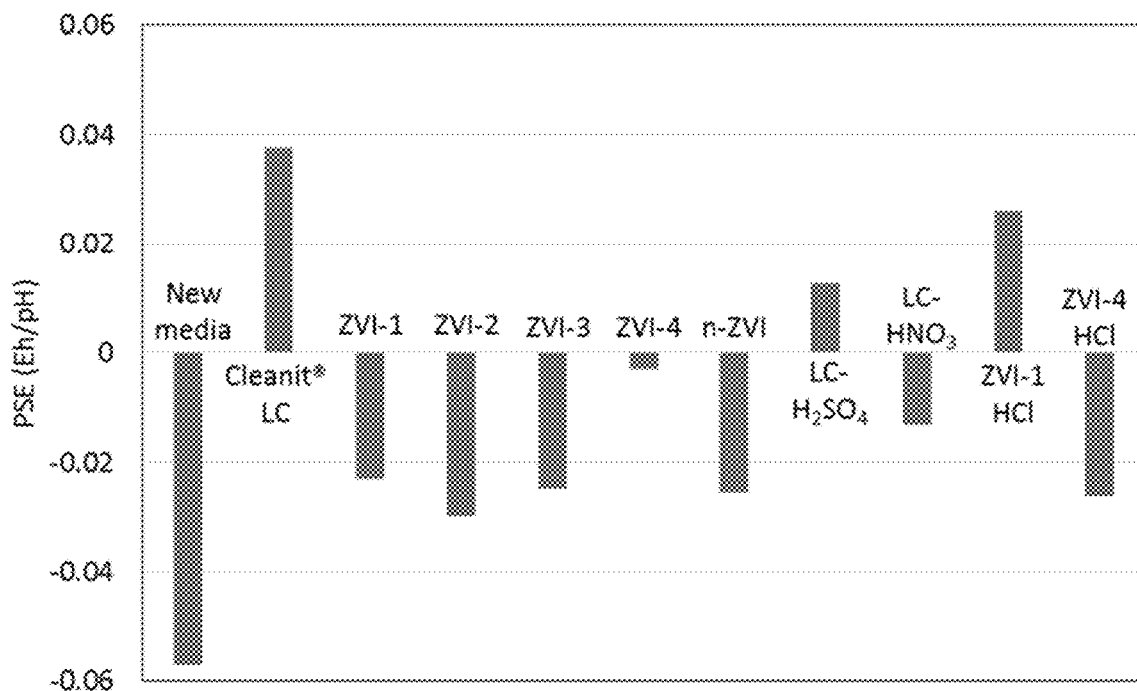

FIGS. 5B and 5C shows the comparison of PSE value of various ZVI media previously tested, including other acid treated CLEAN IT® LC and HCl treated other ZVI media.

The final PSE of the new media is −0.057 V (FIG. 5C). On the other hand, other ZVI media show the PSE value ranging from −0.03 to 0.030 V. The PSE value clearly demonstrates strong reductive potential of the new media along with a unique capability of maintaining the pH of the system. In addition, the comparison of PSE value reassures that the unique property of embodiments of the new media was not be duplicated by other acid treatment of CLEANIT® LC nor HCl treatment with other tested ZVI media.

In an embodiment of the present disclosure, the media may have a PSE of less than −0.03, preferably less than −0.04, preferably less than −0.05, for example a range of −0.03 to −0.5 in an equilibrium condition (e.g., no significant change after 48 hrs), as measured according to the procedure described below.

In an embodiment of the present disclosure, the media may have a PSE of less than −0.03, preferably less than −0.04, preferably less than −0.05, for example a range of −0.03 to −0.5 in an equilibrium condition (e.g., no significant change after 48 hrs), in combination with pH of 8 or less, or a pH in a range of 6-8, as measured according to the procedure described below.

CLEANIT® LC: a source media to produce the new media (available from North American Hoganas), ZVI-1~n-ZVI: other ZVI media, LC-H2SO4: H2SO4 treated LC, LC-HNO3: HNO3 treated LC, ZVI-1_HCl: HCl treated ZVI-1, ZVI-4_HCl: HCl treated ZVI-4).

The parameter, PSE demonstrates the surprising property of embodiments of the new media, i.e. lowering redox potential ($E_h$) without substantially raising the pH, unlike other ZVI media. In addition, the PSE value of embodiments of the new media confirms novelty of the new media by comparison of the PSE values of other ZVI media.

The pH and $E_h$ were measured according to the following procedure:
1. Prepare deoxygenated water by purging $N_2$ gas through DI water in a 2 L beaker at least 2 hours.
2. Put 1 g of ZVI media in a 50 mL Digi-tube.
3. Carefully, fill the tube with the deoxygenated water without headspace, and put an air-tight cap on.
4. Repeat the procedure #2, #3 twice, in order to prepare triplicate samples.
5. Place the tubes on a mechanical shaker in a horizontal position, and start mixing. The mixing speed should be above 100 RPM intending complete mixing without breaking apart the ZVI by collision.
6. At pre-determined time, take out each tube from the shaker, and put in an up-right position for 30 min for separation of ZVI and liquid phase.
7. Carefully open the cap, and measure the oxidation reduction potential (ORP) (mV) with an ORP probe. After the ORP measurement, measure the pH with a pH probe. Then, put the cap back on immediately, and put the tube in the shaker.
8. Repeat the measurements for all triplicates, and use the average value.
9. $E_h$ value is calculated by the equation in below ($E_{ref}$=220 mV).

$$E_h(V) = \frac{ORP + E_{ref}}{1000}$$

Figure 6A:
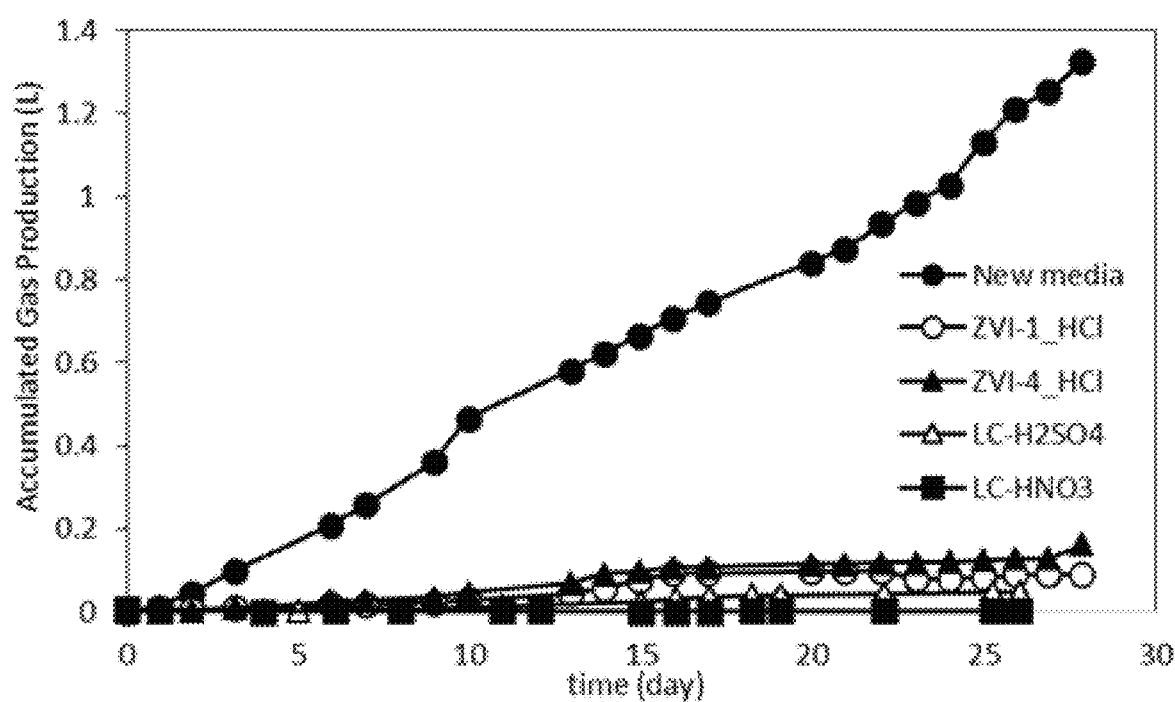
FIGS. 6A-B provide a reactivity assessment of hydrochloric acid washed ZVI media and various acid washed source media.
Figure 6B:
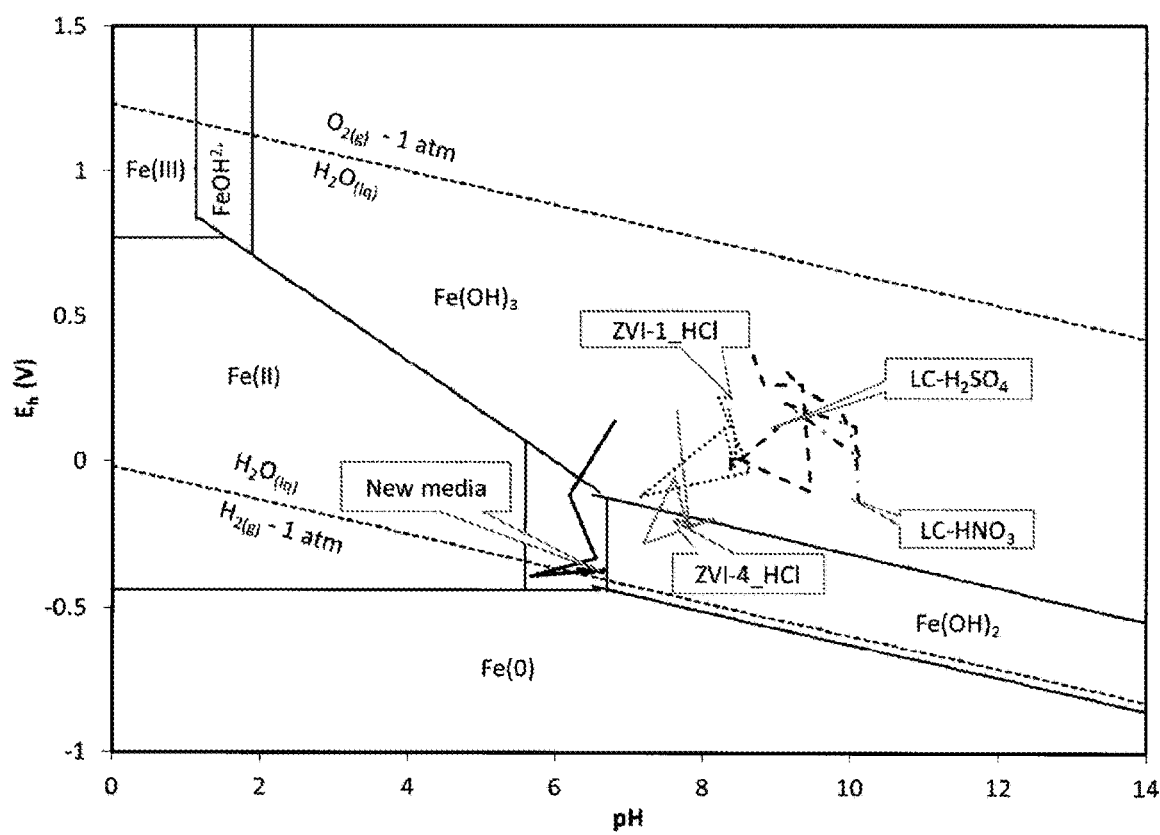

Uniqueness of embodiments of the new media was assessed through application of the identical manufacturing process using other ZVI as a source media. The rational of this approach is that if a simple hydrochloric acid washing process can manufacture a similar highly reactive iron media from other ZVI, there is no uniqueness of the new media. In addition, effect of using various acids in the manufacturing process on the reactivity of the media was examined using a hydrogen reduced iron powder as a source media, to check if any acids can be used for the manufacturing process. The hydrogen gas production and pH-$E_h$ results in FIGS. 6A and 6B presented the authenticity of an embodiment of the new media. Although identical manufacturing method was applied, without a hydrogen reduced iron powder according to International Patent Publication No. WO 2011/015601 A2 and hydrochloric acid, no media presents the high reactivity (i.e. higher hydrogen gas production and circum-neutral pH/low $E_h$ condition) shown by the new media.

2. Application of the New Media for Environmental Remediation and Treatment Process 2.1 Soil and Groundwater Remediation Zero valent iron and microbial dehalogenation are a proven and widely accepted in-situ remediation technology for contaminated soil and groundwater. It is especially effective for degradation of chlorinated VOC, such as PCE, TCE, and daughter products. Each technology can be applied independently. However, if ZVI is applied with proper carbon source, synergetic effect is expected. For example, based on our discovery, ZVI can decompose chlorinated VOCs (e.g., PCE, TCE) in two pathways, such as abiotic and biotic pathway. If a carbon source (e.g., ethanol, organic acid, acetic acid, guar gum, etc.) is available, the two pathways may occur simultaneously. Since microorganism metabolism generally requires two basic resources, such as a carbon source and an energy source, ZVI can be an energy source and another chemical can be a carbon source for biotic pathway. For abiotic pathway, ZVI can act alone to break down the contaminants.

Along with abiotic reductive dechlorination on the surface of ZVI, the ZVI can be an electron/hydrogen donor promoting dehalogenation activity of microbes. Therefore, ZVI media having greater hydrogen gas production potential, such as embodiments of the present invention, will be more effective for degradation of chlorinated VOC. The hydrogen gas production rate and yield of an embodiment of the new media are several times higher than other ZVI media. In addition, the pH stabilizing ability of an embodiment of the present invention may be beneficial for microbial activities since pH 6-8 is considered favorable pH conditions for microbial soil remediation.

2.2 Radionuclides Removal

Application of ZVI for removal of radionuclides, especially nano-ZVI on U removal, has been investigated by many researchers. However, several limitations have been reported for full-scale application, e.g. media handling difficulty resulting from the fine particle size, interference by alternate electron acceptors ($O_2$, $NO_3$, $SO_4$) and multiple contaminants, potential release of immobilized contaminants from the aged and/or spent ZVI media, and so on. In order to evaluate the ability of an embodiment of the new media to remove multiple radionuclides (U, Th) and background contaminant (As) simultaneously in a poor quality alkaline groundwater with elevated levels of $SO_4$ and $NO_3$, batch and column experiments were conducted using a synthesized groundwater. The composition of the synthesized groundwater is shown in Table 1. The contaminant concentrations applied in the synthesized groundwater were several times higher than the drinking water standards in the State of California, U.S.A. For the batch experiment, 5 g of an embodiment of the new media was mixed with 200 mL of the synthesized groundwater with and without $NO_3$ at inside and outside of an anoxic chamber to examine the effect of $O_2$ and $NO_3$ over time. For the column experiment, 1" ID×8" L up-flow columns with ≈100 g of the new media were set-up in parallel. Table 2 summarizes operation conditions of the column experiments, wherein the EBCT is Empty Bed Contact Time, which calculates resident time of water by assuming there is no media in the column (empty volume/flow rate). It is important to note that the objective of the column experiments was to evaluate the impact of total contaminant loading on subsequent extractability using the regulatory extraction methods. Thus, the total volume of water treated by the new media column was controlled approximately 8 L of the synthesized groundwater. After that, the stability of the removed contaminants on the new media was confirmed by regulatory extraction methods for solid waste (e.g., TTLC, STLC, and TCLP).

TABLE 1

Composition of synthesized groundwater.

| Parameters | Units | Synthetic groundwater |
|---|---|---|
| pH | | 7.4 |
| Alkalinity | mg/L as CaCO3 | 200 |
| Uranium | µg/L | 100 |
| Thorium | µg/L | 100 |
| Arsenic | µg/L | 55 |
| Nitrate | mg/L as N | 23 |
| Sodium | mg/L | 93 |
| Calcium | mg/L | 80 |
| Magnesium | mg/L | 36 |
| Sulfate | mg/L | 60 |

TABLE 2

Summary of column experiment conditions.

| Conditions | Flow rate (mL/min) | EBCT (min) | Water Volume Treated (L) | Bed Volume (BV) Treated |
|---|---|---|---|---|
| Long EBCT | 0.23 | 120 | 8.6 | 287 |
| Medium EBCT | 0.87 | 30 | 8.4 | 280 |
| Short EBCT | 3.9 | 7.5 | 8.1 | 270 |

Figure 7A:
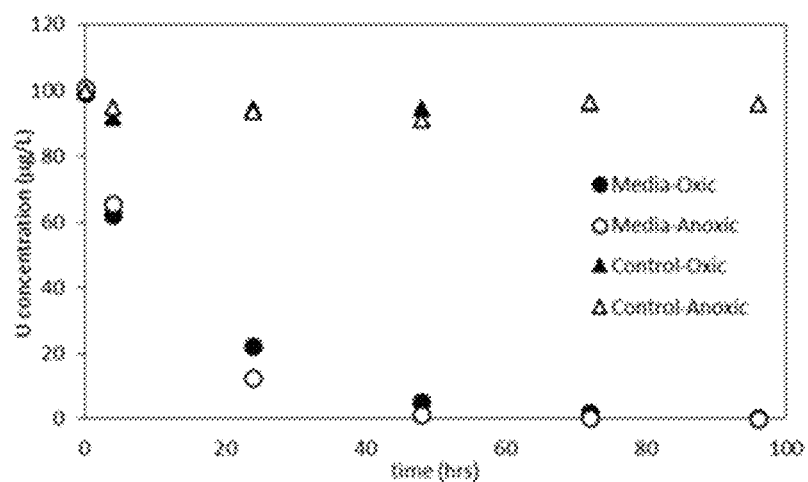
FIGS. 7A-B provide concentration profiles of U and As during the batch experiments.
Figure 7B:
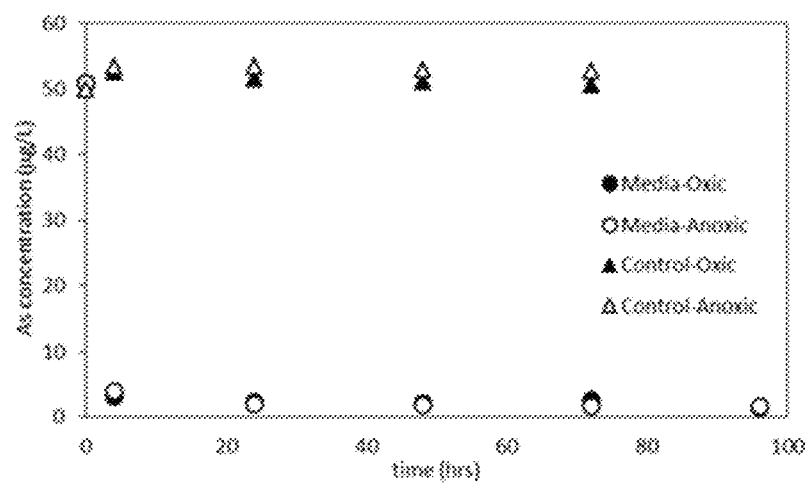
Figure 8A:
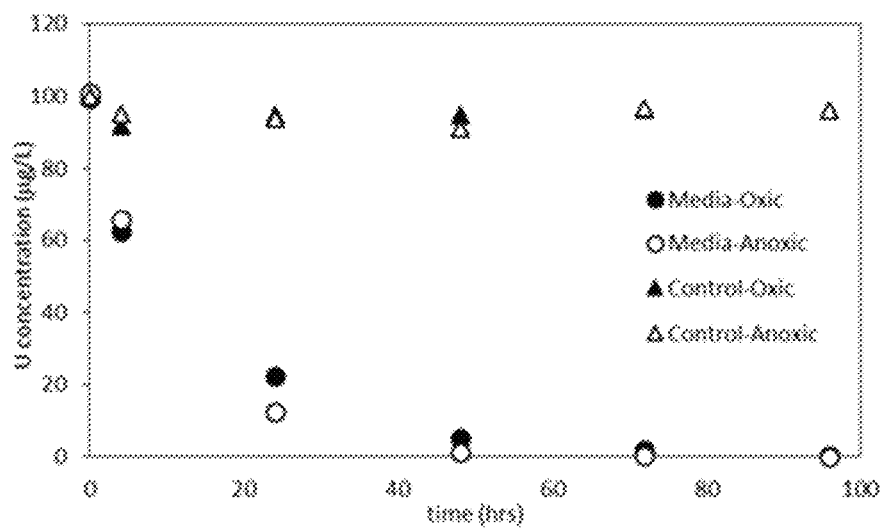
FIGS. 8A-B provides the effect of $NO_3$ on the concentration profiles of U during the batch experiments.
Figure 8B:
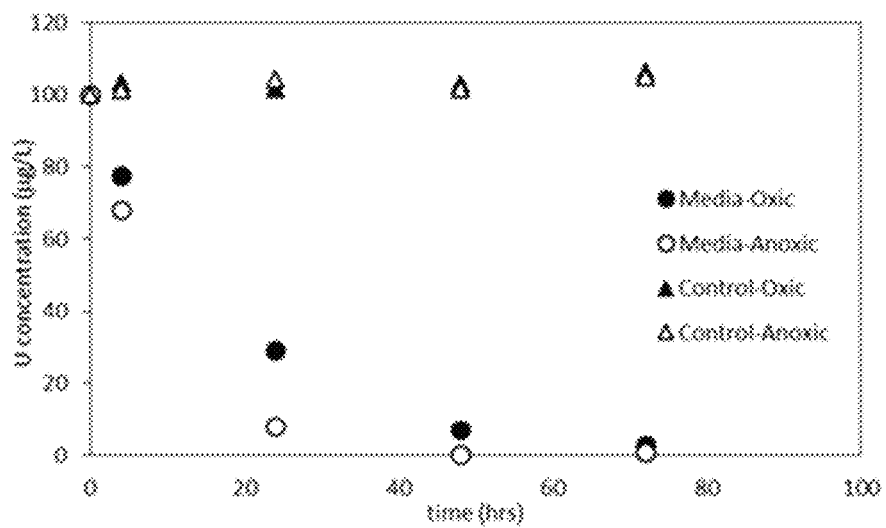

Residual concentrations of U and As in solution for the batch experiments are displayed in FIGS. 7A and 7B. Soluble Th is not presented due to a very low concentration (under the detection limit) in the synthesized groundwater, which indicates that Th was precipitated readily by water chemistry and no impacts on the performance of an embodiment of the new media. No reduction of soluble U and As concentration was observed in the absence of the new media (Control) regardless of the experiment atmosphere. Level of As decreased faster than U level, with only 1-2 µg/L remaining in solution at the first sampling interval (i.e. 4 hrs), and the As levels remained constant throughout the duration of the experiment. This suggests that both As(III) and As(V), regardless of the oxidation state, are removed rapidly by an embodiment of the new media. Although it was slower than As, residual U levels in solution with an embodiment of the new media in both oxic and anoxic condition were decreased to <1 µg/L over time. No significant change in soluble U was observed in the Control without the new media. In addition, U levels in solution with an embodiment of the new media decreased dramatically over the first 24 hours of equilibration regardless of the presence or absence of $NO_3$ shown in FIGS. 8A and 8B. This is a major evident that other electron acceptors ($NO_3$ and $O_2$) do not appear to hinder U immobilization by the new media.

Treatability of radionuclides and background contaminants (U, Th, As) using the new media was proved by the continuous column experiments with various EBCTs. The results are shown in FIGS. 9A, 9B, and 9C. All contaminants were removed very effectively from the synthesized groundwater regardless of EBCTs. Uranium and Th concentrations in the effluent were maintained both <1 µg/L (influent=100 µg/L each), and As concentration was stable at 1-2 µg/L (influent=55 µg/L) during the column experiments. In addition, co-presence of electron acceptors, such as $NO_3$ or $O_2$, did not interfere with the removal of target contaminants.

Stability of the removed As and U on the used media was confirmed by various regulatory extraction methods (TTLC, STLC, TCLP), and the results are summarized in Table 3. After the column experiments, the columns were dismantled and the used media ⅓ from the top, middle, and bottom of the column was sampled and dried for the extraction tests. The concentration of U extracted from the used media by TTLC should not be exceeded the 500 mg/kg according to the NRC licencing19, and that of As should be lower than 500 mg/kg by TTLC and 5 mg/L by TCLP and STLC extraction methods. The concentrations of As and U extracted from the used an embodiment of the new media are all under the regulatory limit, which imply the stability of the contaminants on the new media.

TABLE 3

Summary of column residual extraction results for the TTLC, STLC, and TCLP extractions.

| Leachate Volume Liters | Treatment | Section | Recovered Mass gm | TTLC* | | | STLC** | | | TCLP*** | | |
|---|---|---|---|---|---|---|---|---|---|---|---|---|
| | | | | Limit | As mg/kg 500 | U mg/kg 500 | Limit | As mg/L 5.0 | U mg/L 5.0 | Limit | As mg/L 5.0 | U mg/L 5.0 |
| 8.5 | 120 m EBCT | Outlet | 28.77 | | 5.259 | 0.015 | | 0.0023 | <0.0005 | | <0.002 | <0.010 |
| | | Middle | 29.48 | | 5.426 | 0.010 | | 0.0022 | <0.0005 | | <0.002 | <0.010 |
| | | Inlet | 47.05 | | 16.94 | 23.59 | | 0.0274 | 0.1477 | | <0.002 | 0.051 |
| 8.4 | 30 min EBCT | Outlet | 30.32 | | 5.29 | 0.017 | | 0.0021 | <0.0005 | | <0.002 | <0.010 |
| | | Middle | 34.97 | | 5.60 | 0.041 | | 0.0018 | <0.0005 | | <0.002 | <0.010 |
| | | Inlet | 39.37 | | 17.55 | 23.87 | | 0.0426 | 0.1634 | | <0.002 | 0.071 |
| 8.3 | 7.5 min EBCT | Outlet | 28.61 | | 5.03 | 0.015 | | 0.0026 | <0.0005 | | <0.002 | <0.010 |
| | | Middle | 35.03 | | 5.74 | 0.014 | | 0.0020 | <0.0005 | | <0.002 | <0.010 |
| | | Inlet | 41.41 | | 16.79 | 22.67 | | 0.0590 | 0.1837 | | <0.002 | 0.104 |

*TTLC-Total Threshold Limit Concentration (Based on EPA 3050B)
**STLC-Soluble Threshold Limit Concentration: pH 5.0 Na•Citrate Extraction
***Toxicity Characteristic Leaching Procedure (TCLP): EPA Method 1311

2.3 Selenium Removal from the Saline Groundwater

Selenium removal from a high TDS containing groundwater was tested using an embodiment of the new media in a series of columns. The influent had approximately 20 µg/L of Se and 1530 mg/L of TDS. The details of the water characteristics are shown in Table 4. Series of 1" up-flow columns with an embodiment of the new media (z 120 g) were set-up for the experiment. The EBCT of the column was 15 min each, total 4 columns were installed. FIG. 10 shows the concentration of Se in the influent and each effluent from the column during the experiment. The Se concentration in the final effluent (Eff-4) was sustained less than 5 µg/L (MCL for Se) throughout the study. The new media appears to be less inhibited by the high TDS in the influent. The results confirm the robustness of the new media in terms of the removal of multiple contaminants without the negative effect from the ambient ions.

TABLE 4

Water characteristics of the high TDS groundwater containing Se.

| Parameters | Units | Groundwater |
|---|---|---|
| pH | | 7.95 |
| Alkalinity | mg/L as $CaCO_3$ | 113.75 |
| Selenium | µg/L | 21.6 |
| Chloride | mg/L | 441 |
| Chromium | µg/L | 0.51 |
| Nitrate | mg/L as N | 5.44 |
| Sodium | mg/L | 306 |
| Calcium | mg/L | 153 |
| Magnesium | mg/L | 63 |
| Sulfate | mg/L | 147.3 |
| Potassium | mg/L | 4.61 |
| TDS | mg/L | 1563 |
| Conductivity | µS/cm | 2379 |

3. Comparison of Various Acid Washed Source Media for Contaminant Removal

The uniqueness of embodiments of the new media may be shown by comparison of contaminant removal through batch sorption and breakthrough column experiments Materials and Methods 1. Contaminant: As 30 mg/L, Cr(VI) 100 mg/L in synthesized wastewater (pH 5.5-6.0)
2. Media tested: HCl (the new media), $H_2SO_4$, $HNO_3$ washed source media (identical washing procedure applied), unwashed source media; the source media is a hydrogen reduced iron powder produced according to International Patent Publication No. WO 2011/015601 A2

TABLE 5

Characteristics of the media tested.

| | New media (HCl washed) | $H_2SO_4$ washed | $HNO_3$ washed | Source Media |
|---|---|---|---|---|
| $O_2$ content (%) | 2.02 | 6.04 | 3.14 | 1.07 |
| Mn content (%) | 0.14 | 0.22 | 0.30 | 0.34 |
| BET surface area ($m^2/g$) | 1.91 | 8.2 | 1.9 | 0.2 |

Figure 11A:
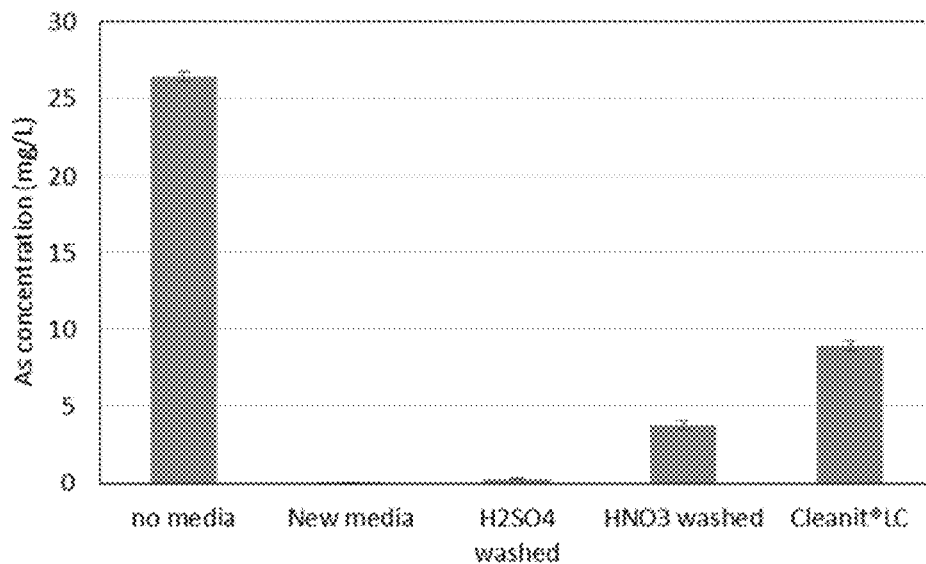
FIGS. 11A-B Concentration of contaminant in supernatant after 3 hr of reaction time.
Figure 11B:
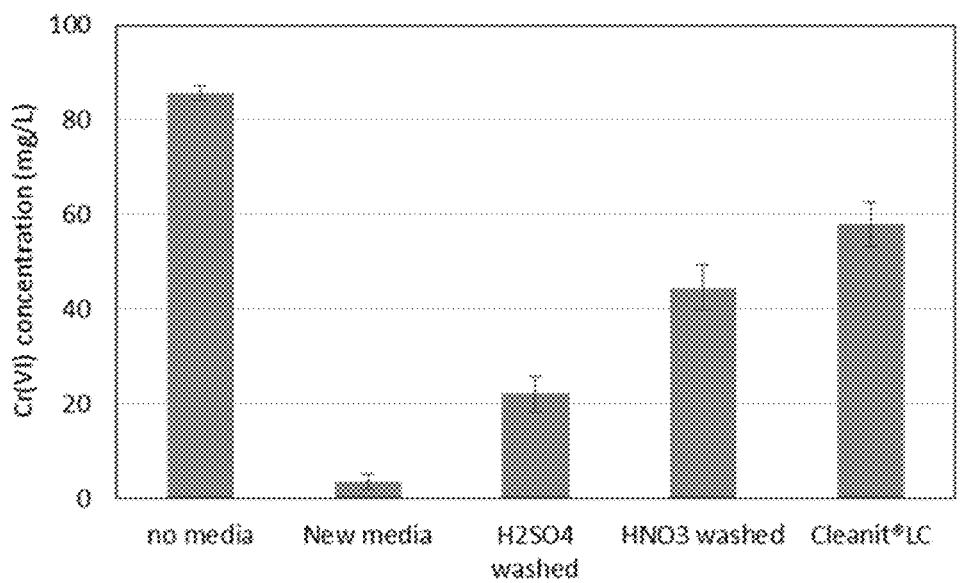

3. Experimental Conditions
   a. Batch sorption experiment
     i. 1 g media in 30 mL synthesized wastewater containing As or Cr(VI)
     ii. 3 hr reaction time on a mechanical shaker
     iii. Triplicates for each data
   b. Breakthrough column experiment
     i. 3.6-3.8 g of each media in a ID 0.6 cm×L 10 cm, upflow column
     ii. 10 min Empty Bed Contact Time (EBCT)
     c. Analysis: ICP-MS after 0.22 µm filtration Results and Discussion Final concentrations of As and Cr(VI) in supernatant after 3 hr. of batch sorption experiment are shown in FIGS. 11A and 11B. Initial concentration was 30 and 100 mg/L for As and Cr(VI), respectively. The new media removed about 99.95% As and 95.98% Cr(VI) after 3 hr of contact time compared to a blank test (wastewater without media, 3 hr contact time). The As and Cr(VI) removal capacity of the new media was far exceeding that of other acid washed media and source media. It confirms the unique ability of the new media in terms of contaminant removal.

Figure 12A:
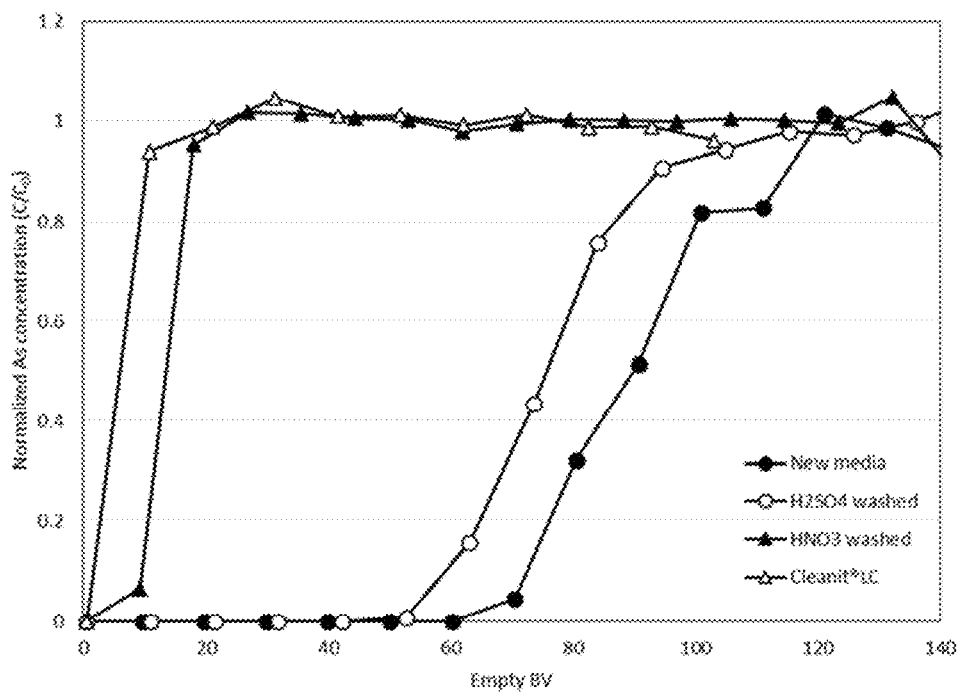
FIGS. 12A-B Breakthrough curve of contaminant based on empty Bed Volume (BV). Normalized by maximum effluent concentration.
Figure 12B:
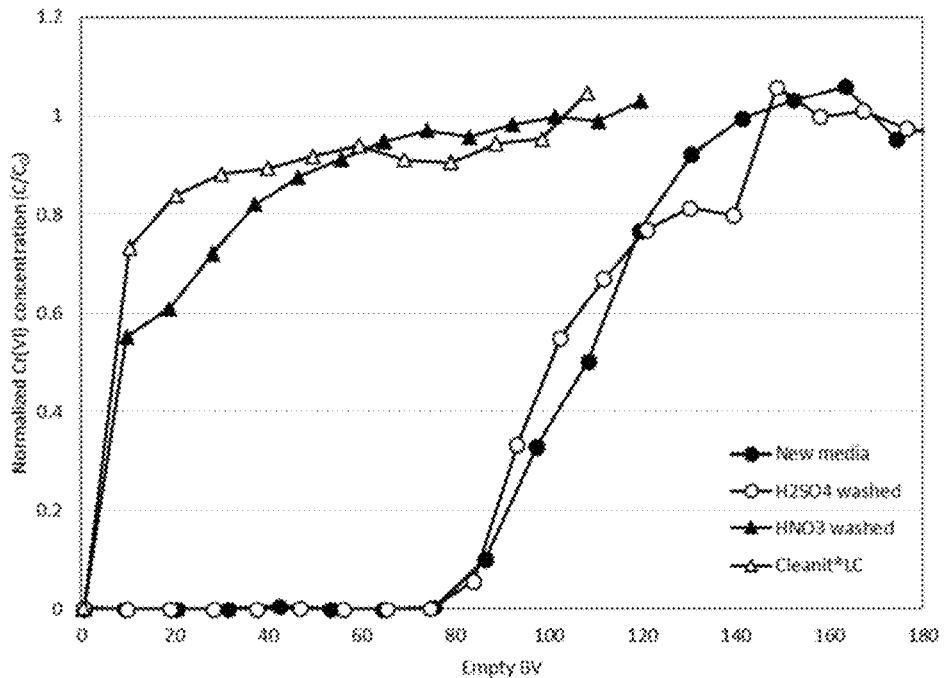

The superior contaminant removal ability of the new media also presented by a breakthrough column experiment using the identical synthesized wastewater. Breakthrough curves of the column filled with each media are shown in FIGS. 12A and 12B. The effluent concentration was normalized by the average concentration of contaminants in column effluent after the concentrations were stabilized. Empty Bed Volume (BV) of the half point of influent concentration (0.5 $C/C_0$) is an indication of the contaminant front moving through the column. The 0.5 $C/C_0$ of an embodiment of the new media column for As was 90 BV, and that of Cr(VI) was 108 BV. The other media columns showed much earlier BV to reach the 0.5 $C/C_0$ point. The comparison of the breakthrough curve tests reconfirms the unique contaminant removal ability of the new media.

Embodiments

1. A filtering medium for reducing the content of contaminants in fluids, wherein said filtering medium comprises an acid-washed iron-based powder,
    wherein the acid-washed iron-based powder is formed by washing an iron-based powder in HCl,
    wherein the BET surface area of the acid-washed iron-based powder is 1.2-10 $m^2/g$, preferably 1.4-8 $m^2/g$, preferably, 1.6-5 $m^2/g$,
    wherein the acid-washed iron-based powder has a Fe content of at least 90% by weight, preferably at least 93% by weight, preferably at least 97% by weight.
2. The filtering medium of embodiment 1, wherein the acid washing comprises hydrochloric acid washing, drying, and cooling process in a protective atmosphere, such as a $N_2$ atmosphere.
3. The filtering medium of any of embodiments 1-2, wherein the iron-based powder is a hydrogen-reduced iron powder.
4. The filtering medium of any of embodiments 1-3, wherein the average particle size (D50) of the acid-washed iron-based powder is 20 to 10,000 µm, preferably 20 to 500 µm, preferably 40 to 350 µm.
5. The filtering medium of any of embodiments 1-4, wherein the average particle size (D50) of the acid-washed iron-based powder is 200 to 590 µm, and the BET surface area is at least 1.6 $m^2/g$.
6. The filtering medium of any of embodiments 1-4, wherein the average particle size (D50) of the acid-washed iron-based powder is less than 200 µm, preferably less than 150 µm, and the BET surface area is at least 3 $m^2/g$, preferably at least 4 $m^2/g$.
7. The filtering medium of any of embodiments 1-6, wherein the apparent density of the acid-washed iron-based powder is 0.5 to 5 $g/cm^3$, preferably 1 to 3 $g/cm^3$, preferably 1 to 2 $g/cm^3$.

8. The filtering medium of any of embodiments 1-7, wherein the iron-based powder is a hydrogen reduced iron-based powder having an average particle size (D50) between 200 and 590 μm and an Fe-content of at least 90% by weight of the iron powder.

9. The filtering medium of any of embodiments 1-8, wherein the acid-washed iron-based powder has a localized chlorine concentration on the surface of at least 3% by EDX spectral analysis, preferably at least 4% by EDX spectral analysis.

10. The filtering medium of any of embodiments 1-9, wherein the acid-washed iron-based powder has a PSE of less than −0.03, preferably less than −0.04, preferably less than −0.05, with a range of −0.03 to −0.5 in an equilibrium condition (after 48 hrs).

11. The filtering medium of any of embodiments 1-10, wherein the fraction of acid-washed iron-based powder below 150 μm is at least 3 $m^2/g$, preferably 3-10 $m^2/g$, preferably 3.5-8 $m^2/g$, preferably 4.0-6.0 $m^2/g$, preferably 4.2 $m^2/g$-5 $m^2/g$.

12. A filtering medium for reducing the content of contaminants in fluids, wherein said filtering medium comprises an iron-based powder,
wherein the iron-based powder has a localized chlorine concentration on the surface of at least 3% by EDX spectral analysis, preferably at least 4% by EDX spectral analysis,
wherein the BET surface area of the iron-based powder is 1.2-10 $m^2/g$, preferably 1.4-8 $m^2/g$, preferably, 1.6-5 $m^2/g$,
wherein the acid-washed iron-based powder has a Fe content of at least 90% by weight, preferably at least 93% by weight, preferably at least 97% by weight.

13. The filtering medium of embodiment 12, wherein the iron-based powder is a hydrogen-reduced iron powder.

14. The filtering medium of any of embodiments 12-13, wherein the average particle size (D50) of the iron-based powder is 20 to 10,000 μm, preferably 20 to 500 μm, preferably 40 to 350 μm.

15. The filtering medium of any of embodiments 12-14, wherein the average particle size (D50) of the iron-based powder is 200 to 590 μm, and the BET surface area is at least 1.6 $m^2/g$.

16. The filtering medium of any of embodiments 12-14, wherein the average particle size (D50) of the iron-based powder is less than 200 μm, preferably less than 150 μm, and the BET surface area is at least 3 $m^2/g$, preferably at least 4 $m^2/g$.

17. The filtering medium of any of embodiments 12-16, wherein the apparent density of the iron-based powder is 0.5 to 5 $g/cm^3$, preferably 1 to 3 $g/cm^3$, preferably 1 to 2 $g/cm^3$.

18. The filtering medium of any of embodiments 12-17, wherein the iron-based powder is a hydrogen reduced iron-based powder having an average particle size (D50) between 40 and 590 μm and an Fe-content of at least 90% by weight of the iron powder.

19. The filtering medium of any of embodiments 12-18, wherein the iron-based powder is an acid-washed iron-based powder formed by washing an iron-based powder in HCl.

20. The filtering medium of embodiment 19, wherein the acid washing comprises hydrochloric acid washing, drying, and cooling process in protective atmosphere, such as a $N_2$ atmosphere.

21. The filtering medium of any of embodiments 12-20, wherein the acid-washed iron-based powder has a PSE of less than −0.03, preferably less than −0.04, preferably less than −0.05, with a range of −0.03 to −0.5 in an equilibrium condition (after 48 hrs).

22. The filtering medium of any of embodiments 12-21, wherein the fraction of acid-washed iron-based powder below 150 μm is at least 3 $m^2/g$, preferably 3-10 $m^2/g$, preferably 3.5-8 $m^2/g$, preferably 4.0-6.0 $m^2/g$, preferably 4.2 $m^2/g$-5 $m^2/g$.

23. A method for reducing the content of contaminants in fluids comprising the steps of:
a) providing a filtering medium according to any of embodiments 1-22,
b) bringing one or more contaminated fluid(s) in contact with the filtering medium to reduce the content of contaminants in said one or more fluid(s),
c) optionally removing the filtering medium from the one or more fluid(s) with a reduced content of contaminants.

24. The method according to embodiment 23, wherein in step b) one or more contaminated fluid(s) is/are allowed to pass through the filtering medium up or downflow direction.

25. The method according to any of embodiments 23-24, wherein said fluid(s) is/are contaminated by at least one of chlorinated VOC, radionuclides, and heavy metals.

26. The method according to embodiment 25, wherein the chlorinated VOC is chosen from the group consisting of TCE, PCE, and their daughter products.

27. A method for producing a filtering medium, wherein the filtering medium is according to any of embodiments 1-22, the method comprising the steps of:
hydrochloric acid washing,
drying and cooling process, optionally in a protective atmosphere, such as an $N_2$ atmosphere.

The invention claimed is:

1. A filtering medium for reducing the content of contaminants in fluids,
wherein said filtering medium comprises an acid-washed iron-based powder,
wherein the iron-based powder is a hydrogen-reduced powder,
wherein the acid-washed iron-based powder is formed by washing an iron-based powder in hydrochloric acid, drying the iron-based powder, and then cooling the iron-based powder under a protective atmosphere,
wherein the Brunauer-Emmett-Teller (BET) surface area of the acid-washed iron-based powder is 3 to 10 $m^2/g$;
wherein the acid-washed iron-based powder has an iron (Fe) content of at least 90% by weight,
wherein the acid-washed iron-based powder has a pH specific Eh (PSE) of less than −0.05 V.

2. The filtering medium of claim 1, wherein the protective atmosphere is a nitrogen atmosphere.

3. The filtering medium of claim 1, wherein the average particle size (D50) of the acid-washed iron-based powder is 20 to 10,000 μm.

4. The filtering medium of claim 1, wherein the average particle size (D50) of the acid-washed iron-based powder is 200 to 590 μm.

5. The filtering medium of claim 1, wherein the average particle size (D50) of the acid-washed iron-based powder is less than 200 μm.

6. The filtering medium of claim 1, wherein the apparent density of the acid-washed iron-based powder is 0.5 to 5 g/cm3.

7. The filtering medium of claim 1, wherein the acid-washed iron-based powder has a localized chlorine concentration on the surface of at least 3% by X Energy Dispersive X-ray (EDX) spectral analysis.

8. A filtering medium for reducing the content of contaminants in fluids,
   wherein said filtering medium comprises an acid-washed iron-based powder,
   wherein the iron-based powder is a hydrogen-reduced iron powder,
   wherein the acid-washed iron-based powder has a localized chlorine concentration on the surface of at least 3% by Energy Dispersive X-ray (EDX) spectral analysis,
   wherein the Brunauer-Emmett-Teller (BET) surface area of the iron-based powder is 3-10 $m^2/g$,
   wherein the acid-washed iron-based powder has an iron (Fe) content of at least 90% by weight,
   wherein the acid-washed iron-based powder has a pH specific Eh of (PSE) less than −0.05 V.

9. The filtering medium of claim 8, wherein the average particle size (D50) of the iron-based powder is 20 to 10,000 µm.

10. The filtering medium of claim 1, wherein the average particle size (D50) of the acid-washed iron-based powder is 200 to 590 µm.

11. The filtering medium of claim 1, wherein the average particle size (D50) of the acid-washed iron-based powder is less than 200 µm.

12. The filtering medium of claim 1, wherein the apparent density of the acid-washed iron-based powder is 0.5 to 5 $g/cm^3$.

13. The filtering medium of claim 8, wherein the iron-based powder having has an average particle size (D50) between 40 and 590 µm.

14. The filtering medium of claim 8, wherein the acid-washed iron-based powder is formed by washing an iron-based powder in hydrochloric acid.

15. The filtering medium of claim 14, wherein the acid washing comprises hydrochloric acid washing, drying, and cooling process in a protective atmosphere.

16. A method for reducing the content of contaminants in fluids comprising the steps of:
   a) providing a filtering medium according to claim 1,
   b) bringing one or more contaminated fluid(s) in contact with the filtering medium to reduce the content of contaminants in said one or more fluid(s),
   c) optionally removing the filtering medium from the one or more fluid(s) with a reduced content of contaminants.

17. The method according to claim 16, wherein in step b) one or more contaminated fluid(s) is/are allowed to pass through the filtering medium in an up or downflow direction.

18. The method according to claim 16, wherein said fluid(s) is/are contaminated by at least one of chlorinated volatile organic compounds (VOC), radionuclides, and heavy metals.

19. The method according to claim 18, wherein the chlorinated VOC is chosen from the group consisting of trichloroethylene (TCE), tetrachloroethylene (PCE), and their daughter products.

20. A method for producing a filtering medium, wherein the filtering medium is according to claim 1, the method comprising the steps of:
   hydrochloric acid washing
   drying and cooling process, optionally in a protective nitrogen atmosphere.

* * * * *